(12) United States Patent
Lee et al.

(10) Patent No.: US 12,288,555 B2
(45) Date of Patent: Apr. 29, 2025

(54) ELECTRONIC DEVICE AND OPERATION METHOD THEREOF

(71) Applicant: SAMSUNG ELECTRONICS CO., LTD., Suwon-si (KR)

(72) Inventors: Yoonju Lee, Suwon-si (KR); Dongwan Kim, Suwon-si (KR); Juwhan Kim, Suwon-si (KR); Yoonjae Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 300 days.

(21) Appl. No.: 17/944,618

(22) Filed: Sep. 14, 2022

(65) Prior Publication Data

US 2023/0081558 A1     Mar. 16, 2023

Related U.S. Application Data

(63) Continuation of application No. PCT/KR2022/012999, filed on Aug. 31, 2022.

(30) Foreign Application Priority Data

Sep. 14, 2021   (KR) .................... 10-2021-0122746

(51) Int. Cl.
*G10L 15/22*   (2006.01)
*G06F 3/16*   (2006.01)
(Continued)

(52) U.S. Cl.
CPC .............. *G10L 15/22* (2013.01); *G06F 3/167* (2013.01); *G06F 40/30* (2020.01); *G10L 15/18* (2013.01);
(Continued)

(58) Field of Classification Search
CPC .............. G10L 15/22; G10L 2015/223; G10L 15/1822; G10L 15/18; G06F 3/167; G06F 40/30
See application file for complete search history.

(56) References Cited

U.S. PATENT DOCUMENTS 8,255,224 B2   8/2012   Singleton et al.
8,498,670 B2   7/2013   Cha et al.
(Continued)

FOREIGN PATENT DOCUMENTS

KR     20150089145 A    8/2015
KR     20170054707 A    5/2017
(Continued)

OTHER PUBLICATIONS

International Search Report with English Translation and Written Opinion for International Application No. PCT/KR2022/012999; International Filing Date Aug. 31, 2022; Date of Mailing Dec. 16, 2022; 10 pages.

*Primary Examiner* — Samuel G Neway
(74) *Attorney, Agent, or Firm* — CANTOR COLBURN LLP

(57) ABSTRACT

An electronic device receives a voice input, and determines whether the voice input is matched with a natural language understanding (NLU) model for determining the presence or absence of a verb. The electronic device further identifies a display context object associated with the voice input based on the voice input being matched with the NLU model. The electronic device calculates a similarity value between the voice input and the display context object, and update a user interface (UI) depending on the calculated the similarity values.

10 Claims, 16 Drawing Sheets

(51) Int. Cl.
*G06F 40/30* (2020.01)
*G10L 15/18* (2013.01)

(52) U.S. Cl.
CPC .... *G10L 15/1822* (2013.01); *G10L 2015/223* (2013.01)

(56) References Cited

U.S. PATENT DOCUMENTS

| | | | |
|---|---|---|---|
| 8,725,505 B2 * | 5/2014 | Mowatt | G10L 15/22 |
| | | | 704/235 |
| 9,711,149 B2 | 7/2017 | Han et al. | |
| 10,466,962 B2 * | 11/2019 | Wilberding | H04L 12/282 |
| 10,510,338 B2 | 12/2019 | Singleton et al. | |
| 10,606,555 B1 | 3/2020 | Wilberding et al. | |
| 10,811,002 B2 | 10/2020 | Cho et al. | |
| 11,294,457 B2 | 4/2022 | Seo et al. | |
| 11,721,333 B2 | 8/2023 | Lee et al. | |
| 2003/0189603 A1 * | 10/2003 | Goyal | G10L 15/22 |
| | | | 704/E15.04 |
| 2013/0326353 A1 * | 12/2013 | Singhal | G06F 16/683 |
| | | | 715/728 |
| 2017/0206896 A1 * | 7/2017 | Ko | G06F 3/16 |
| 2019/0392816 A1 | 12/2019 | Kim et al. | |
| 2020/0043472 A1 | 2/2020 | Singleton et al. | |
| 2020/0395010 A1 * | 12/2020 | Smith | G10L 15/1815 |
| 2023/0081558 A1 * | 3/2023 | Lee | G10L 15/1822 |
| | | | 704/239 |

FOREIGN PATENT DOCUMENTS

| | | |
|---|---|---|
| KR | 20190043519 A | 4/2019 |
| KR | 20190095620 A | 8/2019 |
| KR | 20190101330 A | 8/2019 |
| KR | 20200063777 A | 6/2020 |
| KR | 20220093280 A | 7/2022 |

* cited by examiner

| DELIVERED UTTERANCE (1001) | VERBLESS NLU MODEL MATCHING RESULT (1011) | SCORE CALCULATOR RESULT (1021) |
|---|---|---|
| JURASSIC (1002) | INPUT UTTERANCE IS SUBSTRING OF "JURASSIC WORLD FALLEN KINGDOM", AND THUS IS MATCHED WITH VERBLESS NLU MODEL (1012) | 0.4 (1022) |
| JURASSIC WORLD (1003) | INPUT UTTERANCE IS SUBSTRING OF "JURASSIC WORLD FALLEN KINGDOM", AND THUS IS MATCHED WITH VERBLESS NLU MODEL (1013) | 0.67 (1023) |
| JURASSIC WORLD FALLEN (1004) | INPUT UTTERANCE IS SUBSTRING OF "JURASSIC WORLD FALLEN KINGDOM", AND THUS IS MATCHED WITH VERBLESS NLU MODEL (1014) | 0.86 (1024) |
| JURASSIC WORLD FALLEN KINGDOM (1005) | INPUT UTTERANCE IS SUBSTRING OF "JURASSIC WORLD FALLEN KINGDOM", AND THUS IS MATCHED WITH VERBLESS NLU MODEL (1015) | 1 (1025) |

FIG. 10

| DELIVERED UTTERANCE (1101) | DOMAIN/INTENT/SLOT NLU MODEL MATCHING RESULT (1111) | SCORE CALCULATOR RESULT (1121) |
|---|---|---|
| "JURASSIC WORLD FALLEN KINGDOM" | DOMAIN: MOVIE,. INTENT: PLAY, SLOT NAME: MEDIA, SLOT VALUE: JURASSIC WORLD FALLEN KINGDOM (1112) | 1 (1122) |
| PLAY "JURASSIC WORLD FALLEN KINGDOM" | DOMAIN: MOVIE,. INTENT: PLAY, SLOT NAME: MEDIA, SLOT VALUE: JURASSIC WORLD FALLEN KINGDOM (1113) | 1 (1123) |
| PLEASE PLAY "JURASSIC WORLD FALLEN KINGDOM" | DOMAIN: MOVIE,. INTENT: PLAY, SLOT NAME: MEDIA, SLOT VALUE: JURASSIC WORLD FALLEN KINGDOM (1114) | 1 (1124) |

FIG. 11

ELECTRONIC DEVICE AND OPERATION METHOD THEREOF

CROSS-REFERENCE TO RELATED APPLICATION(S)

This application is a continuation application, claiming priority under § 365(c), of an International Application No. PCT/KR2022/012999, filed on Aug. 31, 2022, which is based on and claims the benefit of a Korean patent application number 10-2021-0122746, filed on Sep. 14, 2021, in the Korean Intellectual Property Office, the disclosure of which is incorporated by reference herein in its entirety.

TECHNICAL FIELD

Various embodiments disclosed in this specification relate to an electronic device and an operating method of the electronic device.

BACKGROUND ART

With the development of artificial intelligence (AI) technology, terminals including voice assistants that use AI are widely available. Furthermore, in addition to a conventional input method using a keyboard or a mouse, electronic devices support various input methods such as a voice input. For example, the electronic devices such as smart phones or tablet computers may receive a user command/instruction as a voice input and, in response, provide a corresponding output/service.

Such voice based processing requires speech recognition service, which in turn includes natural language processing (NLP). NLP refers to a technology that grasps the intent of a user input (utterance), generates the result matched with the intent, and provides a user with the service according to the result.

Speech recognition service can provide various control command functions such as a function of selecting or scrolling a specified item displayed an electronic device's screen based on a user input. Such NLP technology can use AI at various junctures. Voice commands from a user may be effectively operated upon by using AI operatively connected to, or provided by the electronic device.

Accordingly, a function of displaying a screen control result according to a voice command to a user in real time may be requested.

DISCLOSURE

Technical Problem

An electronic device, via a screen/display unit, may display multiple objects. A user may desire to interact with one of the objects displayed via a voice command. In some instances, the user may desire the interaction to be occurring in real time. There are several technical challenges/problems in facilitating a user to interact with an on-screen object in real time using a voice command/input from the user. Such technical challenges are addressed by embodiments described herein.

Technical problems to be addressed by one or more embodiments disclosed in this specification include displaying a screen control result according to a user voice input in real time.

Technical problems to be addressed by one or more embodiments disclosed in this specification include displaying a screen control result in real time by using natural language understanding models depending on whether a verb or reaction is included in a user voice input.

Technical problems to be addressed by one or more embodiments disclosed in this specification include displaying a screen control result in real time based on a similarity value between a user voice input and a display context object.

Technical Solution

According to an embodiment disclosed in this specification, an electronic device may receive a voice input of a user using a microphone which is included in the electronic device or which is operatively connected to the electronic device. The electronic device may determine whether the voice input is matched with a natural language understanding (NLU) model for determining the presence or absence of a verb. The electronic device may identify a displayed object associated with the voice input based on the voice input being matched with the NLU model. The electronic device may calculate a similarity value between the voice input and an object that is displayed by the electronic device. The electronic device may update a user interface depending on the calculated result based on the similarity value, and display the user interface. The user interface may be output/displayed/rendered/depicted/visualized on a display which is included in the electronic device or which is operatively connected to the electronic device.

According to an embodiment disclosed in this specification, a method performed by an electronic device may include receiving a voice input from a user using a microphone included in the electronic device or operatively connected to the electronic device. The method includes determining whether the voice input is matched with a NLU model for determining the presence or absence of a verb. The method includes identifying a display context object associated with the voice input based on the voice input being matched with the NLU model. The method includes calculating a similarity value between the voice input and the display context object. The method includes updating a user interface based on the similarity value depending on the calculated result. The method includes displaying the user interface.

Advantageous Effects

Embodiments disclosed in this specification facilitate a method and device for displaying a screen control result according to a user voice input in real time.

Embodiments disclosed in this specification facilitate a method and device for displaying a screen control result in real time by using different NLU models depending on whether a verb or reaction is included in a user voice input.

Embodiments disclosed in this specification facilitate a method and device for displaying a screen control result in real time based on a similarity value between a user voice input and a display context object.

Besides, a variety of effects directly or indirectly understood through the specification may be provided by one or more embodiments described herein.

DESCRIPTION OF DRAWINGS

FIG. 10 is an exemplary diagram of a result obtained as an electronic device determines whether a verbless NLU model is matched, and determines similarity according to the determined result, according to an embodiment disclosed in the specification.

FIG. 11 is an exemplary diagram of a result obtained as an electronic device classifies domains, intents, and slots depending on a user input and determines similarity depending on the classified result when a user voice input does not match to the verbless NLU model, according to an embodiment of the disclosure.

With regard to description of drawings, the same or similar components will be marked by the same or similar reference signs.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
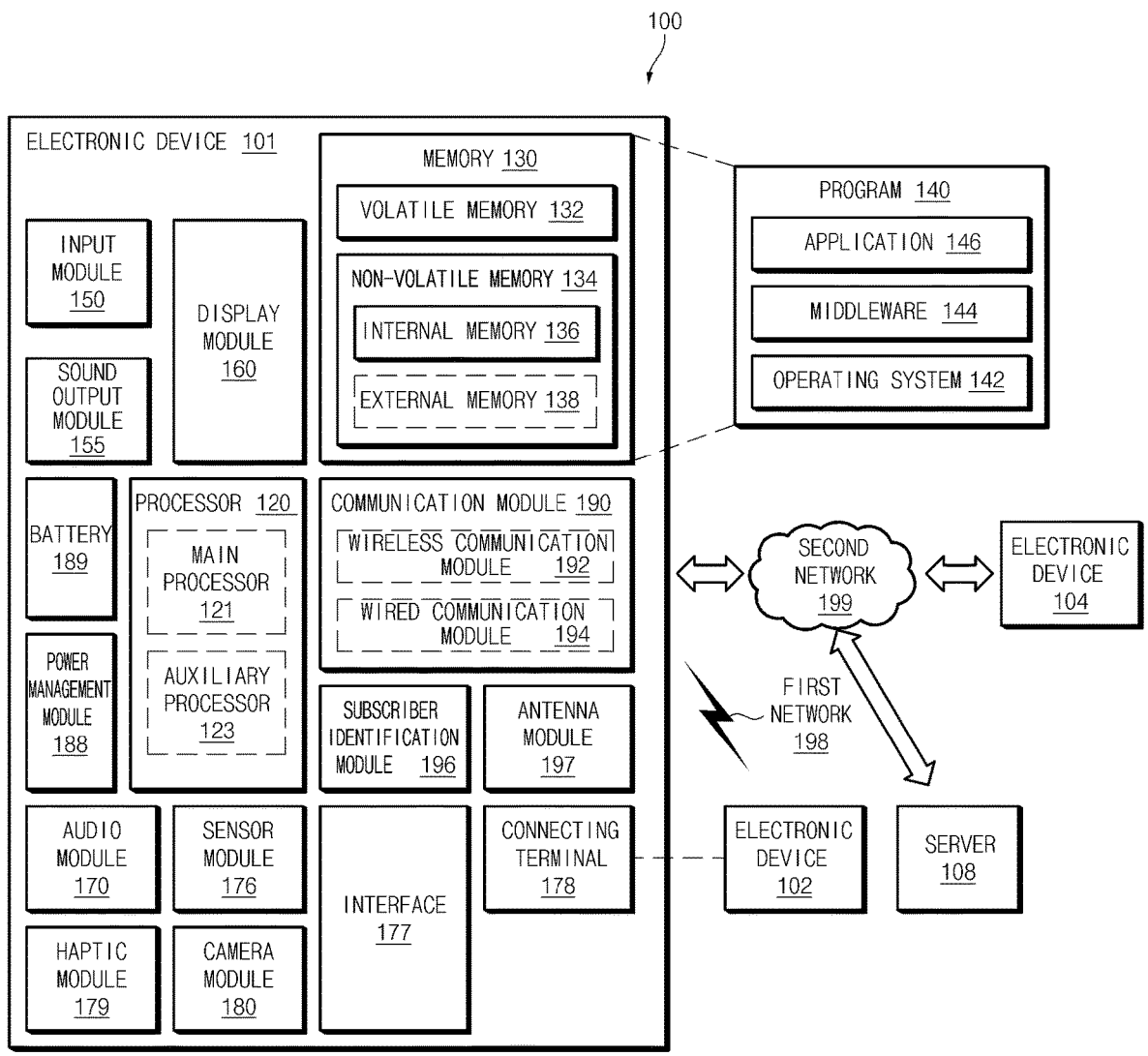
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
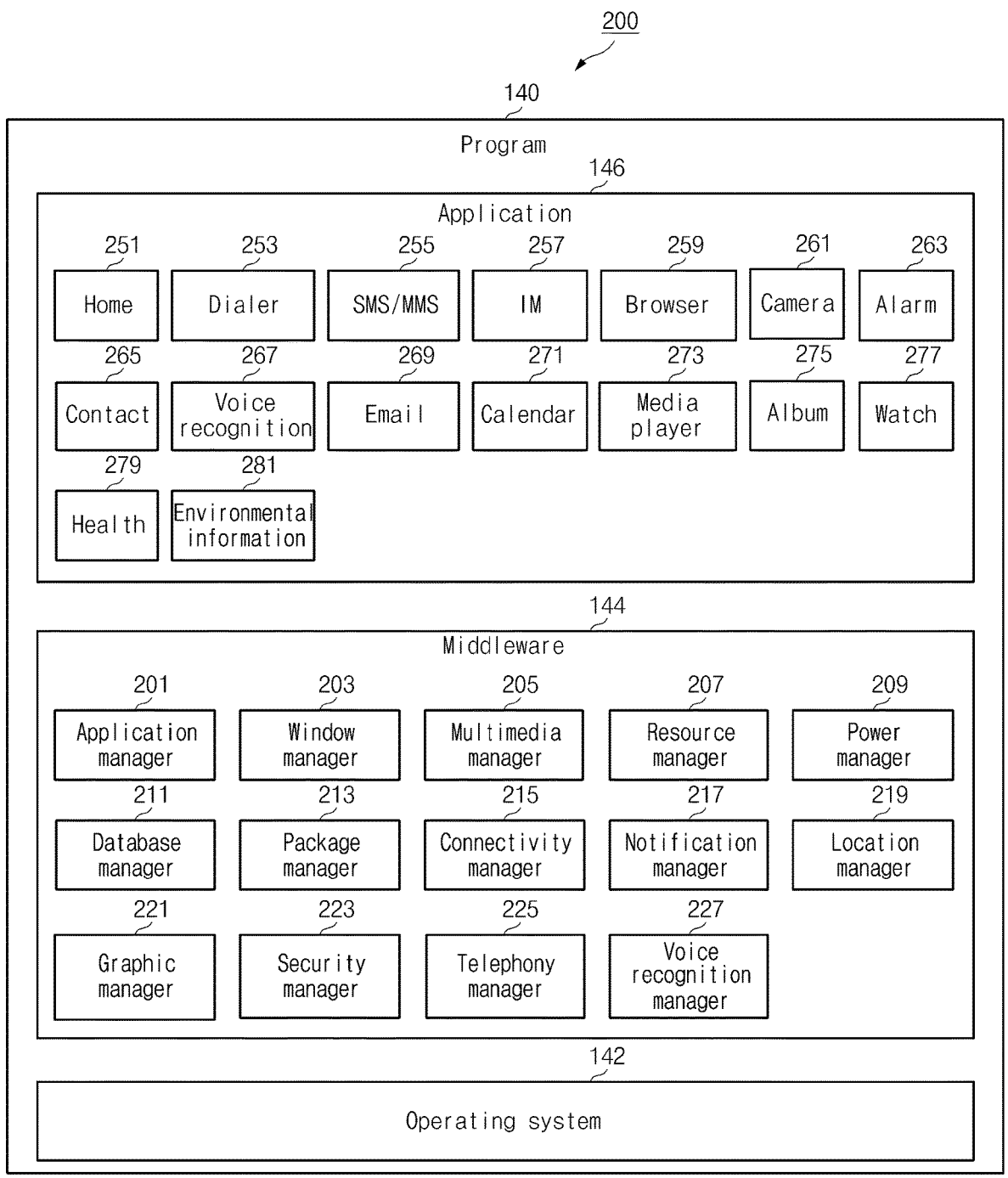
FIG. 2 is a block diagram of a program, according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™ Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
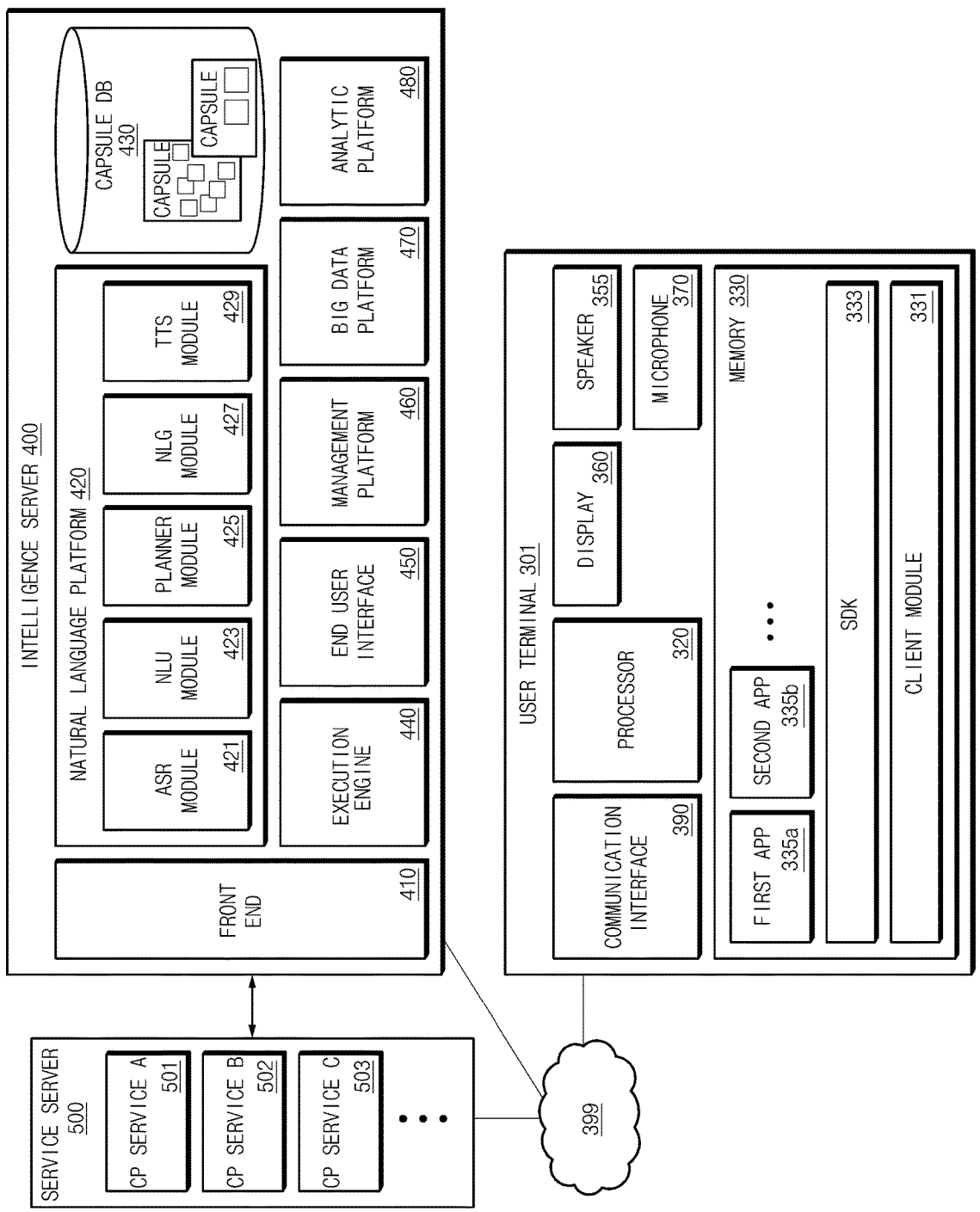
FIG. 3 is a block diagram illustrating an integrated intelligence system, according to an embodiment.

FIG. 3 is a block diagram illustrating an integrated intelligence system, according to an embodiment.

Referring to FIG. 3, an integrated intelligence system according to an embodiment may include a user terminal 301, an intelligence server 400, and a service server 500.

The user terminal 301 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, a head mounted display (HMD), or a smart speaker.

According to the illustrated embodiment, the user terminal 301 may include a communication interface 390, a microphone 370, a speaker 355, a display 360, a memory 330, or a processor 320. The listed components may be operatively or electrically connected to one another.

The communication interface 390 according to an embodiment may be connected to an external device and may be configured to transmit or receive data to or from the external device. The microphone 370 according to an embodiment may receive a sound (e.g., a user utterance) to convert the sound into an electrical signal. The speaker 355 according to an embodiment may output the electrical signal as sound (e.g., voice). The display 360 according to an embodiment may be configured to display an image or a video. The display 360 according to an embodiment may display the graphic user interface (GUI) of the running app (or an application program).

The memory 330 according to an embodiment may store a client module 331, a software development kit (SDK) 333, and a plurality of apps 335. The client module 331 and the SDK 333 may constitute a framework (or a solution program) for performing general-purposed functions. Furthermore, the client module 331 or the SDK 333 may constitute the framework for processing a voice input.

The plurality of apps 335 may be programs for performing a specified function. According to an embodiment, the plurality of apps may include a first app 335a and/or a second app 335b. According to an embodiment, each of the plurality of apps 335 may include a plurality of actions for performing a specified function. For example, the apps may include an alarm app, a message app, and/or a schedule app. According to an embodiment, the plurality of apps 335 may be executed by the processor 320 to sequentially execute at least part of the plurality of actions.

According to an embodiment, the processor 320 may control overall operations of the user terminal 301. For example, the processor 320 may be electrically connected to the communication interface 390, the microphone 370, the speaker 355, and the display 360 to perform a specified operation. For example, the processor 320 may include at least one processor.

Moreover, the processor 320 according to an embodiment may execute the program stored in the memory 330 so as to perform a specified function. For example, according to an embodiment, the processor 320 may execute at least one of the client module 331 or the SDK 333 so as to perform a following operation for processing a voice input. The processor 320 may control operations of the plurality of apps 335 via the SDK 333. The following actions described as the actions of the client module 331 or the SDK 333 may be the actions performed by the execution of the processor 320.

According to an embodiment, the client module 331 may receive a voice input. For example, the client module 331 may receive a voice signal corresponding to a user utterance detected through the microphone 370. The client module 331 may transmit the received voice input (e.g., a voice input) to the intelligence server 400. The client module 331 may transmit state information of the user terminal 301 to the intelligence server 400 together with the received voice input. For example, the state information may be execution state information of an app.

According to an embodiment, the client module 331 may receive a result corresponding to the received voice input. For example, when the intelligence server 400 is capable of calculating the result corresponding to the received voice input, the client module 331 may receive the result corresponding to the received voice input. The client module 331 may display the received result on the display 360.

According to an embodiment, the client module 331 may receive a plan corresponding to the received voice input. The client module 331 may display, on the display 360, a result of executing a plurality of actions of an app depending on the plan. For example, the client module 331 may sequentially display the result of executing the plurality of actions on a display. As another example, the user terminal 301 may display only a part of results (e.g., a result of the last action) of executing the plurality of actions, on the display.

According to an embodiment, the client module 331 may receive a request for obtaining information necessary to calculate the result corresponding to a voice input, from the intelligence server 400. According to an embodiment, the client module 331 may transmit the necessary information to the intelligence server 400 in response to the request.

According to an embodiment, the client module 331 may transmit, to the intelligence server 400, information about the result of executing a plurality of actions depending on the plan. The intelligence server 400 may identify that the received voice input is correctly processed, by using the result information.

According to an embodiment, the client module 331 may include a speech recognition module. According to an embodiment, the client module 331 may recognize a voice input for performing a limited function, via the speech recognition module. For example, the client module 331 may launch an intelligence app for processing a specific voice input by performing an organic action, in response to a specified voice input (e.g., wake up!).

According to an embodiment, the intelligence server 400 may receive information associated with a user's voice input from the user terminal 301 over a communication network. According to an embodiment, the intelligence server 400 may convert data associated with the received voice input to text data. According to an embodiment, the intelligence server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 400 may transmit a result according to the generated plan to the user terminal 301 or may transmit the generated plan to the user terminal 301. According to an embodiment, the user terminal 301 may display the result according to the plan, on a display. According to an embodiment, the user terminal 301 may display a result of executing the action according to the plan, on the display.

The intelligence server 400 according to an embodiment may include a front end 410, a natural language platform 420, a capsule database 430, an execution engine 440, an end user interface 450, a management platform 460, a big data platform 470, or an analytic platform 480.

According to an embodiment, the front end 410 may receive a voice input received from the user terminal 301. The front end 410 may transmit a response corresponding to the voice input to the user terminal 301.

According to an embodiment, the natural language platform 420 may include an automatic speech recognition (ASR) module 421, a natural language understanding (NLU) module 423, a planner module 425, a natural language generator (NLG) module 427, and/or a text to speech module (TTS) module 429.

According to an embodiment, the ASR module 421 may convert the voice input received from the user terminal 301 into text data. According to an embodiment, the NLU module 423 may grasp the intent of the user by using the text data of the voice input. For example, the NLU module 423 may grasp the intent of the user by performing syntactic analysis or semantic analysis. According to an embodiment, the NLU module 423 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 425 may generate the plan by using a parameter and the intent that is determined by the NLU module 423. According to an embodiment, the planner module 425 may determine a plurality of domains necessary to perform a task, based on the determined intent. The planner module 425 may determine a plurality of actions included in each of the plurality of domains determined based on the intent. According to an embodiment, the planner module 425 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters necessary to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan by using information stored in the capsule DB 430 storing a set of relationships between concepts and actions.

According to an embodiment, the NLG module 427 may change specified information into information in a text form. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 301.

The capsule DB 430 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information necessary to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 301. According to an embodiment, the capsule DB 430 may include a vocabulary registry storing vocabulary information included in capsule information. According to an embodiment, the capsule DB 430 may include a dialog registry storing information about dialog (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 301.

According to an embodiment, the execution engine 440 may calculate a result by using the generated plan. The end user interface 450 may transmit the calculated result to the user terminal 301. Accordingly, the user terminal 301 may receive the result and may provide the user with the received result. According to an embodiment, the management platform 460 may manage information used by the intelligence server 400. According to an embodiment, the big data platform 470 may collect data of the user. According to an embodiment, the analytic platform 480 may manage quality of service (QoS) of the intelligence server 400. For example, the analytic platform 480 may manage the component and processing speed (or efficiency) of the intelligence server 400.

According to an embodiment, the service server 500 may provide the user terminal 301 with a specified service (e.g., ordering food or booking a hotel). According to an embodiment, the service server 500 may be a server operated by the third party. According to an embodiment, the service server 500 may provide the intelligence server 400 with information for generating a plan corresponding to the received voice input. The provided information may be stored in the capsule DB 430. Furthermore, the service server 500 may provide the intelligence server 400 with result information according to the plan.

In the above-described integrated intelligence system, the user terminal 301 may provide the user with various intelligent services in response to a user input. The user input may include, for example, an input through a physical button, a touch input, or a voice input.

According to an embodiment, the user terminal 301 may provide a speech recognition service via an intelligence app (or a speech recognition app) stored therein. In this case, for example, the user terminal 301 may recognize a user utterance or a voice input, which is received via the microphone, and may provide the user with a service corresponding to the recognized voice input.

According to an embodiment, the user terminal 301 may perform a specified action, based on the received voice input, independently, or together with the intelligence server and/or the service server. For example, the user terminal 301 may launch an app corresponding to the received voice input and may perform the specified action via the executed app.

In an embodiment, when providing a service together with the intelligence server 400 and/or the service server, the user terminal 301 may detect a user utterance by using the microphone 370 and may generate a signal (or voice data) corresponding to the detected user utterance. The user terminal may transmit the voice data to the intelligence server 400 by using the communication interface 390.

According to an embodiment, the intelligence server 400 may generate a plan for performing a task corresponding to the voice input or the result of performing an action depending on the plan, as a response to the voice input received from the user terminal 301. For example, the plan may include a plurality of actions for performing the task corresponding to the voice input of the user and/or a plurality of concepts associated with the plurality of actions. The concept may define a parameter to be entered upon executing the plurality of actions or a result value output by the execution of the plurality of actions. The plan may include relationship information between the plurality of actions and/or the plurality of concepts.

According to an embodiment, the user terminal 301 may receive the response by using the communication interface 390. The user terminal 301 may output the voice signal generated in the user terminal 301 to the outside by using the speaker 355 or may output an image generated in the user terminal 301 to the outside by using the display 360.

Figure 4:
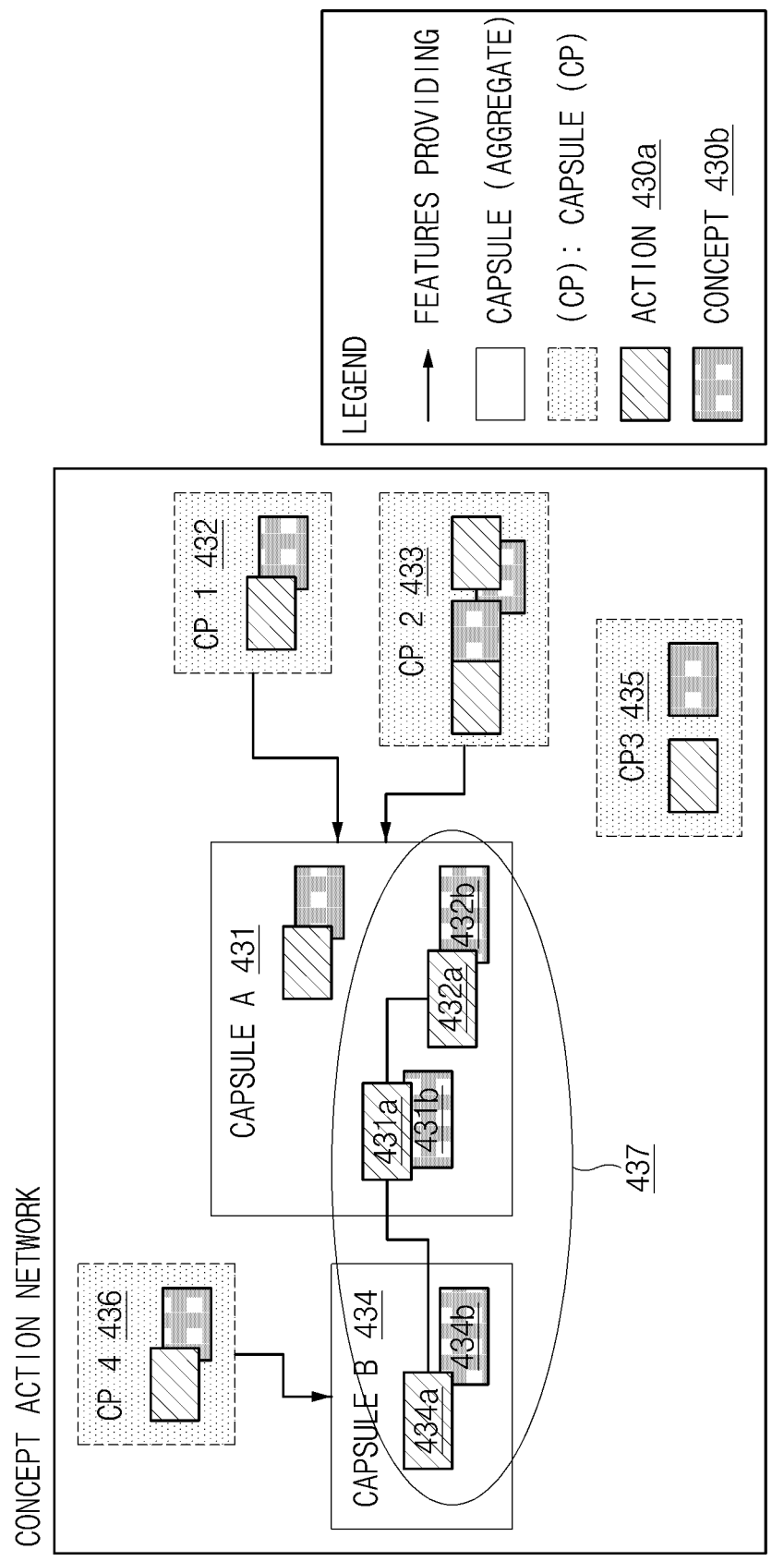
FIG. 4 is a diagram illustrating the form in which relationship information between a concept and an action is stored in a database, according to an embodiment.

FIG. 4 is a diagram illustrating a form in which relationship information between a concept and an action is stored in a database, according to various embodiments.

A capsule database (e.g., the capsule DB 430) of the intelligence server 400 may store a capsule in the form of a CAN. The capsule DB may store an action for processing a task corresponding to a user's voice input and a parameter necessary for the action, in the CAN form.

The capsule DB may store a plurality capsules (a capsule A 431 and a capsule B 434) respectively corresponding to a plurality of domains (e.g., applications). According to an embodiment, a single capsule (e.g., the capsule A 431) may correspond to a single domain (e.g., a location (geo) or an application). Furthermore, at least one service provider (e.g., CP 1 432 or CP 2 433) for performing a function for a domain associated with the capsule may correspond to one capsule. According to an embodiment, the one capsule may include at least one or more actions 430a and at least one or more concepts 430b for performing a specified function.

The natural language platform 420 may generate a plan for performing a task corresponding to the received voice input by using the capsule stored in a capsule database. For example, the planner module 425 of the natural language platform may generate the plan by using the capsule stored in the capsule database. For example, a plan 437 may be generated by using actions 431a and 432a and concepts 431b and 432b of the capsule A 431 and an action 434a and a concept 434b of the capsule B 434.

Figure 5:
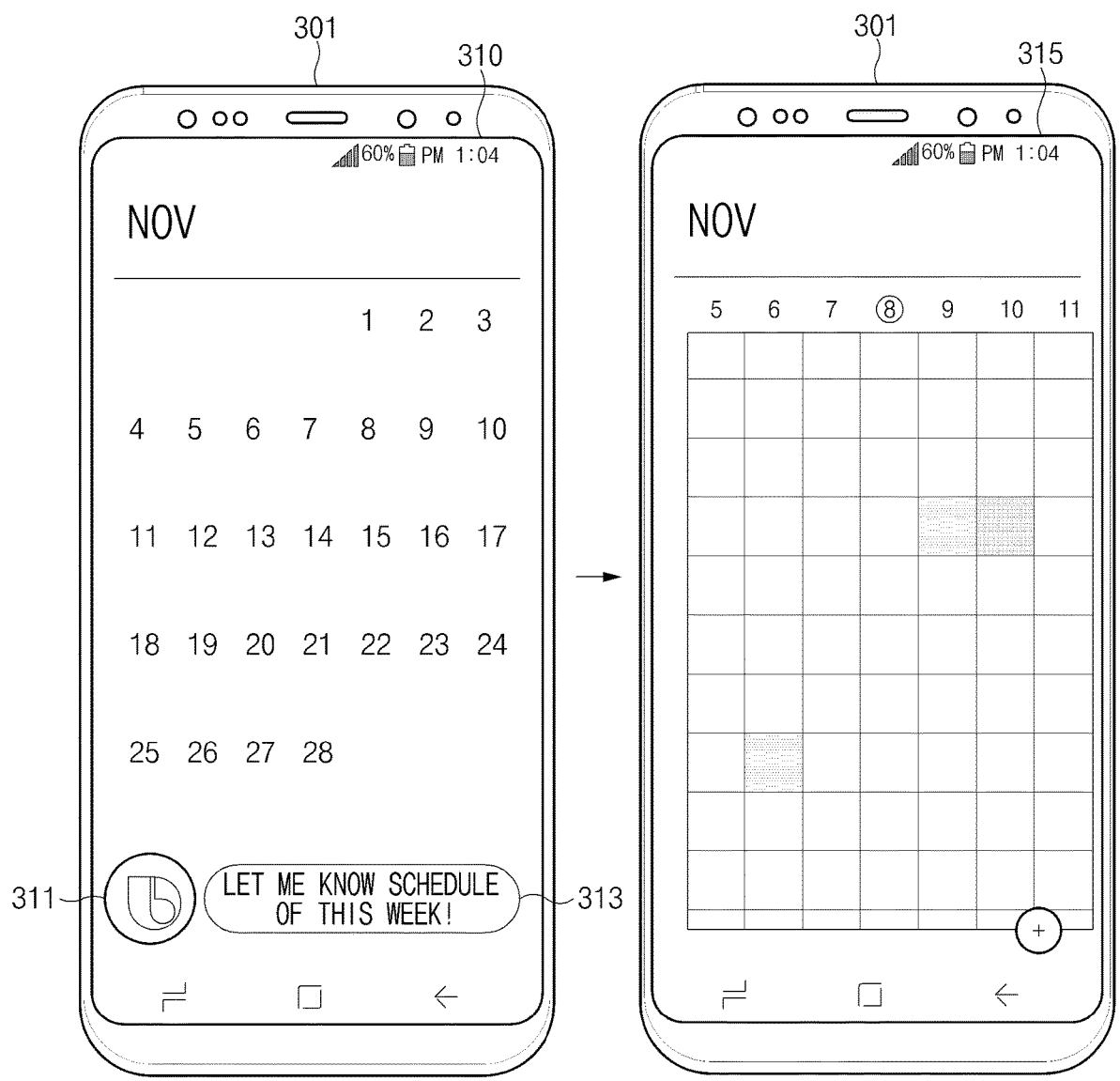
FIG. 5 is a view illustrating a user terminal displaying a screen of processing a voice input received through an intelligence app, according to an embodiment.

FIG. 5 is a view illustrating a screen in which a user terminal processes a voice input received through an intelligence app, according to various embodiments.

The user terminal 301 may execute an intelligence app to process a user input through the intelligence server 400.

According to an embodiment, on screen 310, when recognizing a specified voice input (e.g., wake up!) or receiving an input via a hardware key (e.g., a dedicated hardware key), the user terminal 301 may launch an intelligence app for processing a voice input. For example, the user terminal 301 may launch the intelligence app in a state where a schedule app is executed. According to an embodiment, the user terminal 301 may display an object (e.g., an icon) 311 corresponding to the intelligence app, on the display 360. According to an embodiment, the user terminal 301 may receive a voice input by a user utterance. For example, the user terminal 301 may receive a voice input saying that "let me know the schedule of this week!". According to an embodiment, the user terminal 301 may display a user interface (UI) 313 (e.g., an input window) of the intelligence app, in which text data of the received voice input is displayed, on a display.

According to an embodiment, on screen 315, the user terminal 301 may display a result corresponding to the received voice input, on the display. For example, the user terminal 301 may receive a plan corresponding to the received user input and may display 'the schedule of this week' on the display depending on the plan.

In an embodiment, the user terminal 301 of FIGS. 3, 4, and 5 may correspond to the electronic device 101 of FIG. 1. In an embodiment, the intelligence server 400 of FIG. 3 may correspond to one of the electronic device 104 and the server 108 of FIG. 1. In an embodiment, the processor 320 of FIG. 3 may correspond to the processor 120 of FIG. 1; the display 360 of FIG. 3 may correspond to the display module 160 of FIG. 1; and, the speaker 355 of FIG. 3 may correspond to the sound output module 155 of FIG. 1.

Figure 6:
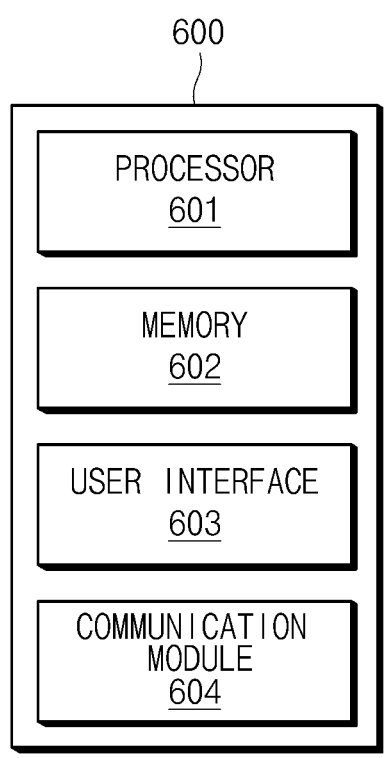
FIG. 6 is a block diagram illustrating a structure of an electronic device, according to an embodiment disclosed in the specification.

FIG. 6 is a block diagram illustrating a structure of an electronic device 600, according to an embodiment disclosed in the specification. For clarity of description, descriptions that are the same as the above-mentioned descriptions may be briefly described or omitted.

Referring to FIG. 6, the electronic device 600 may include a processor 601 (e.g., the processor 320 of FIG. 3 and/or the processor 120 of FIG. 1), a memory 602 (e.g., the memory 130 of FIG. 1), a user interface 603, and a communication module 604 (e.g., the communication module 190 of FIG. 1). The user interface 603 may include a display (e.g., the display 360 of FIG. 3 and/or the display module 160 of FIG. 1), a microphone (e.g., the microphone 370 of FIG. 3 and/or the input module 150 of FIG. 1), and a speaker (e.g., the speaker 355 of FIG. 3 and/or the sound output module 155 of FIG. 1).

The electronic device 600 may further include components in addition to the components illustrated in FIG. 6. According to an embodiment, the components of the electronic device 600 may be the same entities or may constitute separate entities.

The electronic device 600 may be a smartphone, a tablet PC, a wearable device, a home appliance, or a digital camera. According to an embodiment, the processor 601 may be operatively coupled to the communication module 604, the memory 602, and the user interface 603 (e.g., a display, a microphone and/or a speaker) to perform overall functions of the electronic device 600. In some examples, the processor 601 may include one or more processors. For example, the one or more processors may include an image signal processor (ISP), an application processor (AP), or a communication processor (CP).

Figure 7:
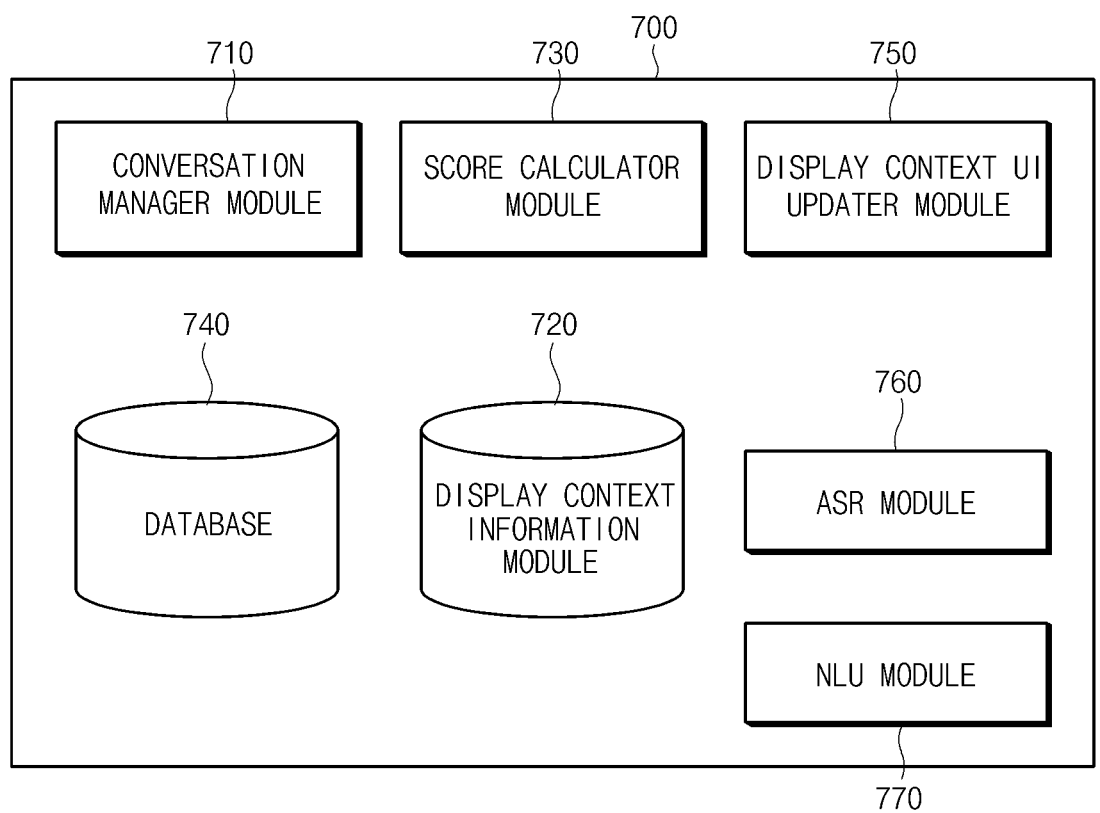
FIG. 7 is another block diagram illustrating a structure of an electronic device, according to an embodiment disclosed in the specification.

Furthermore, the processor 601 may drive a module (e.g., a conversation manager module 710, a display context information module 720, a score calculator module 730, a display context UI updater module 750, an ASR module 760, and/or an NLU module 770 shown in FIG. 7) by executing instructions stored in the memory 602. The processor 601 may drive/operate additional modules in one or more embodiments.

The processor 601 may be operatively connected to the module (e.g., the conversation manager module 710, the display context information module 720, the score calculator module 730, the display context UI updater module 750, the ASR module 760, and/or the NLU module 770 in FIG. 7) to perform overall functions of the electronic device 600. In the embodiment disclosed in this specification, it may be understood that an operation performed (or executed) by the module (e.g., the conversation manager module 710, the display context information module 720, the score calculator module 730, the display context UI updater module 750, the ASR module 760, and/or the NLU module 770 in FIG. 7) is an operation performed by the processor 601 by executing instructions stored in the memory 602.

In an embodiment, the processor 601 may include a module (e.g., the conversation manager module 710, the display context information module 720, the score calculator module 730, the display context UI updater module 750, the ASR module 760 and/or the NLU module 770 in FIG. 7). In this case, the operation performed (or executed) by each module (e.g., the conversation manager module 710, the display context information module 720, the score calculator module 730, the display context UI updater module 750, the ASR module 760, and/or the NLU module 770 in FIG. 7) may be implemented as at least part of the processor 601.

Several modules described in various embodiments of the disclosure may be implemented by hardware, software, or a combination thereof.

The memory 602 may store a database (e.g., the database 740 of FIG. 7) including at least one input data. The memory 602 may store commands, information, or data associated with operations of components included in the electronic device 600. For example, the memory 602 may store instructions, when executed, that cause the processor 601 to perform various operations described in the specification.

In an embodiment, the electronic device 600 may receive a user input by using the user interface 603. The user input may be an input including a user voice signal (e.g., a user's utterance input).

In an embodiment, the user input may be the user's voice input (e.g., an utterance). When the user input is a voice input, the electronic device 600 may receive a user input through a microphone (or a voice receiving module).

In an embodiment, the user input may be a gesture input and/or a touch input. When the user input is a gesture input and/or a touch input, the electronic device 600 may receive a user input through a sensor, such as a touch screen, etc.

According to an embodiment, the processor 601 may include a sound module. The sound module may recognize a user input for executing an operation. For example, the sound module may recognize and receive the voice signal. For example, the sound module recognizing the user input may have a high speech recognition rate because ambient noise is strong.

According to an embodiment, the sound module may be trained to recognize and receive the user input by using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

According to an embodiment, the sound module may perform tasks of data refinement, data integration, data reduction, and/or data conversion. The data refinement may include an operation of filling in incomplete data and correcting inconsistent data. The data integration may include an operation of merging various divided databases or files for easy analysis. The data reduction may include an operation of sampling only some of input data or reducing the dimension of data to be analyzed. The data conversion may include an operation of normalizing or grouping data by obtaining an average value of the data. The sound module may process data, thereby preventing meaningless values from being included in data or preventing data quality from being degraded due to unintended variables. Accuracy and timeliness may be increased through the sound module.

In an embodiment, at least one operation among operations of each component described with reference to the electronic device 600 may be performed (or executed) by an external server (not illustrated) or another electronic device (not illustrated). For example, the processor 601 may transmit a user input to the external server or the other electronic device by using the communication module 604.

A processor included in the external server or the other electronic device may receive the user input, generate response data, and transmit the response data to the electronic device 600.

The processor 601 may receive the response data corresponding to the user input from the external server or the other electronic device through the communication module 604. When receiving the response data, the processor 601 may allow the response data to be output through the user interface 603. Alternatively, through the communication module 604, other devices may be controlled or data may be stored. The processor 601 may be composed of at least one or more processors, and may be driven while being physically divided into a main processor performing high-performance processing and an auxiliary processor performing low-power processing. Alternatively, one processor may process data by switching between a high performance mode and a low power mode depending on situations.

Hereinafter, an operation of the processor 601 will be described in detail.

According to an embodiment disclosed in this specification, an electronic device may include a microphone, a display, a memory, and a processor operatively connected to the microphone, the display, and the memory. The memory may store instructions that, when executed, cause the processor to receive a voice input of a user using the microphone, to determine whether the voice input is matched with a verbless natural language understanding (NLU) model for determining the presence or absence of a verb, to identify a display context object associated with the voice input based on whether the voice input is matched with the verbless NLU model, to calculate a similarity value between the voice input and the display context object, and to update a user interface depending on the calculated result based on the similarity value and display the user interface on the display.

According to an embodiment disclosed in this specification, an electronic device may update and display the user interface by displaying a display context object determined depending on the calculated result so as to be distinguished from another display context object displayed on the display.

According to an embodiment disclosed in this specification, an electronic device may identify the display context object associated with the voice input based on whether the voice input at least partly includes a substring of the display context object when the voice input is matched with the verbless NLU model.

According to an embodiment disclosed in this specification, an electronic device may determine a domain, intent, and slot of the voice input using an NLU model for classifying the domain, intent, and slot with respect to a voice input and may identify a display context object having the same type of a slot as the determined slot when the voice input is not matched with the verbless NLU model.

According to an embodiment disclosed in this specification, an electronic device may initialize the similarity value when the display context object having the same type of a slot as the determined slot is not identified.

According to an embodiment disclosed in this specification, an electronic device may set at least one of an ambiguous state value or a level value based on the number of display context objects associated with the voice input when the voice input is matched with the verbless NLU model.

According to an embodiment disclosed in this specification, the electronic device may set the ambiguous state value to 'none' and may set the level value to '0' when the number of display context objects associated with the voice input is '0'.

According to an embodiment disclosed in this specification, the electronic device may set the ambiguous state value to 'false' and may set the level value to the calculated similarity value when the number of display context objects associated with the voice input is '1'.

According to an embodiment disclosed in this specification, the electronic device may set the ambiguous state value to 'true' and may set the level value to the calculated similarity value when the number of display context objects associated with the voice input is greater than or equal to '2'.

According to an embodiment disclosed in this specification, the electronic device may set at least one of an ambiguous state value or a level value based on whether the similarity value is greater than or equal to a threshold.

FIG. 7 is another block diagram illustrating a structure of an electronic device 700, according to an embodiment disclosed in this specification. For clarity of description, descriptions of portions that are the same as the above-mentioned descriptions may be briefly described or omitted.

According to an embodiment that is illustrated, the electronic device 700 (e.g., the user terminal 301 of FIG. 3 or the electronic device 600 of FIG. 6) may include a conversation manager module 710, a display context information module 720, a score calculator module 730, a database 740, a display context UI updater module 750, an ASR module 760, and/or an NLU module 770. The listed components may be operatively or electrically connected to one another.

The conversation manager module 710 may transmit, to the NLU module 770, a user's voice command (or utterance) received through a user interface (e.g., the user interface 603 of FIG. 6) included in the electronic device or operatively connected the electronic device. The conversation manager module 710 may store the user's voice command and display context information together in the display context information module 720. The display context information may be information about an object (e.g., content) being provided through a screen included in the electronic device or operatively connected to the electronic device. For example, when content "Jurassic World: Fallen Kingdom" is being displayed through the screen, the display context information may be in a form of Table 1.

TABLE 1

```
[
 ...
  {
   "category": "media",
   "text_org": "Jurassic World: Fallen Kingdom",
   "text_var": ["Jurassic World: Fallen Kingdom", "Jurassic World: Fallen Kingdom"],
   "action_type": "uri",
   "action_value":
"bixby ://com. android, sy stemui/voiceclick/background?id= 1",
   "matcher": {
    "type": "partial"
   }
  },
 ...
]
```

In an embodiment, referring to Table 1, "category" may be the type of a context object that is present in the screen. The NLU module 770 may analyze the intent of a user utterance by using the context object type. In an embodiment, "text_org" may be text information displayed through the context object. "text_var" may have the same meaning as "text_org", but may be variation information capable of being expressed in another text. In an embodiment, "action_type" may be a value that specifies an action type as to how to operate when a user utterance is matched with a context object. "action_value" may be an action value (e.g., a protocol capable of being exchanged between applications or services, such as Uniform Resource Identifier (URI), and capable of analyzing intent) as to how to operate when a user utterance is matched with a context object.

In an embodiment, the conversation manager module 710 may store information about an object, which is being displayed through the screen, in the display context information module 720. For example, the conversation manager module 710 may store a text, which is being displayed through the screen, in the display context information module 720.

In an embodiment, the conversation manager module 710 may receive information about an object, which is being displayed through the screen, from an application (not shown) operating the screen and then may store information about the object in the display context information module 720.

In an embodiment, the conversation manager module 710 may transmit, to the NLU module 770, a user's voice command received through a user interface included in the electronic device or operatively connected to the electronic device and then may receive the result obtained as the NLU module 770 analyzes the delivered voice command.

In an embodiment, the conversation manager module 710 may facilitate the score calculator module 730 to calculate the similarity between the display context information module 720 and the voice command based on the analysis result.

In an embodiment, the conversation manager module 710 may deliver the calculated similarity to the display context UI updater module 750 and then may facilitate the display context UI updater module 750 to determine an item displayed on a screen, and how to show the item based on the calculated similarity.

In an embodiment, the conversation manager module 710 may deliver the result determined by the display context UI updater module 750 to the application such that information matched with the voice command is displayed on the screen in real time.

In an embodiment, to perform an operation according to a voice command or to generate an appropriate response message based on the calculated similarity, the conversation manager module 710 may transmit similarity information to an execution module (not shown) and/or a response message generation module (not shown).

FIG. 7 illustrates that the display context information module 720, the score calculator module 730, and the display context UI updater module 750 are implemented separately, but this is not to be construed as being limited thereto. For example, the conversation manager module 710 may include the display context information module 720, the score calculator module 730, and the display context UI updater module 750.

The display context information module 720 may be a data module that stores display context information. Along with the display context information, the display context information module 720 may store a similarity value between the display context object and the input user utterance. The similarity value may be a result value calculated by the score calculator module 730.

The display context information module 720 may receive and store the similarity value calculated by the score calculator module 730 through the conversation manager module 710.

The display context UI updater module 750 may determine an object, which is to be displayed, from among display context objects based on the similarity value. The display context UI updater module 750 may select a display context object having a similarity value equal to or greater than a threshold or the highest similarity value with respect to the received user voice input (or a user utterance or a user's voice command). Alternatively, the display context UI updater module 750 may select a context object having a similarity value, which is greater than or equal to the threshold and which is the highest similarity value, with respect to the received user voice input.

In an embodiment, the display context UI updater module 750 may determine an ambiguous state value and may display a UI that matches the ambiguous state value. In an embodiment, the display context UI updater module 750 may determine the ambiguous state value based on the number of context objects and may display a UI that matches the ambiguous state value. For example, when only one (i.e., a single) context object is present, the display context UI updater module 750 may determine that the ambiguous state value is false, and may display a UI that matches the ambiguous state value. On the other hand, when a plurality of found display context objects are present, the display context UI updater module 750 may determine that the ambiguous state value is true, and may display a UI based on the ambiguous state value.

In an embodiment, when the ambiguous state value is true, the display context UI updater module 750 may provide a first effect to the vicinity of the matched display context object and may induce a user to enter an additional input. In an embodiment, when the ambiguous state value is true, the display context UI updater module 750 may deliver the determined ambiguous state value to the application, may provide a first effect to the vicinity of the matched display context object, and may induce the user to enter an additional input. The first effect may be an effect distinguished from an unmatched display context object. For example, the first effect may be used to provide a highlighting effect with a specified color. The display context UI updater module 750 or the application may induce the user to enter an additional input user by providing the first effect to the vicinity of the matched display context object, and thus may provide a notification that a situation is ambiguous because the user voice input corresponds to a screen control utterance but matches a plurality of display context objects.

The display context UI updater module 750 or the application may update the UI by using the similarity value as well as the ambiguous state value and then may control the UI such that the UI is displayed. For example, the conversation manager module 710 may deliver a similarity value, which is currently calculated and which is stored in the display context information module 720, to the display context UI updater module 750 and then may allow the display context UI updater module 750 or the application operating the UI to update the UI based on the transmitted similarity value such that the UI is displayed. For example, the display context UI updater module 750 or the application may gradually update the UI by using a time until the next input is delivered.

The score calculator module 730 may calculate the similarity between a user voice input and a display context object. For example, the score calculator module 730 may calculate the similarity between a text obtained by converting the user voice input and a text included in the display context object. The score calculator module 730 may calculate the similarity between texts by using various algorithms that measure morphological and/or semantic similarity between texts. For example, the score calculator module 730 may calculate similarity by using a Levenshtein distance algorithm in a method of calculating the insertion, change, and/or deletion between two texts. For example, the score calculator module 730 may calculate the similarity between texts in a method of measuring the similarity between vectors of two texts by using cosine similarity.

In an embodiment, the score calculator module 730 may calculate the similarity using a method of searching for a word and/or phrase having the highest similarity, by embedding words included in the voice input, phrases included in the voice input, and/or the entire voice input corresponding to the entire utterance. The embedding may refer to a scheme of expressing string data as a numeric vector. For example, the score calculator module 730 may find words and/or phrases having high similarity by using word-embedding of expressing a word included in a voice input as a dense vector.

The Automatic Speech Recognition (ASR) module 760 may convert the received user voice input into text data. For example, the ASR module 760 may convert voice data, which is received by using a user input, into text data.

The NLU module 770 may grasp the user's intent by performing syntactic analysis or semantic analysis. According to an embodiment, the NLU module 770 may grasp the meaning of words extracted from the voice input by using linguistic features (e.g., syntactic elements) such as morphemes or phrases and may determine the intent of the user by matching the grasped meaning of the words to the intent.

The NLU module 770 may be a single model or may be composed of a plurality of models. The model may be an exact matching-based model or a probability-based model. In an embodiment, when commands are given through only the text on the screen without a verb expression, an exact matching-based model (e.g., a token or substring) may be used or a partial matching-based model (e.g., a verbless NLU model) may be used. Also, a rule-based NLU model may be used based on an utterance pattern that is frequently used.

In an embodiment, the NLU module 770 (or the conversation manager module 710) may determine whether the user utterance is a display context control utterance.

For example, the NLU module 770 (or the conversation manager module 710) may determine that the user utterance is a display context control utterance, based on whether at least part of the result analyzed by using the at least one NLU model is matched (or similarity).

When it is determined that the user utterance is the control utterance, the conversation manager module 710 may deliver, to an application, an action value (e.g., "action_value" in Table 1) defined in a display context.

In an embodiment, when it is determined that the user utterance is not the control utterance, the conversation manager module 710 may classify domain, intent, and/or slot of the user utterance. The NLU module 770 may be a module including a verbless NLU module, a domain classifier module, an intent classifier module and/or a slot tagger module. Hereinafter, this will be described in detail with reference to FIG. 14.

In an embodiment, a probability-based model may be used to process a screen control command composed of various verb expressions and the arrangement of words. The probability-based model may utilize artificial neural network technologies such as CNN, RNN, and/or attention. Moreover, a forward-based model may be used to update a UI without delay by analyzing commands in real time. Alternatively, combinations of the above-described models or a model different from the above-described model may be used.

Figure 8:
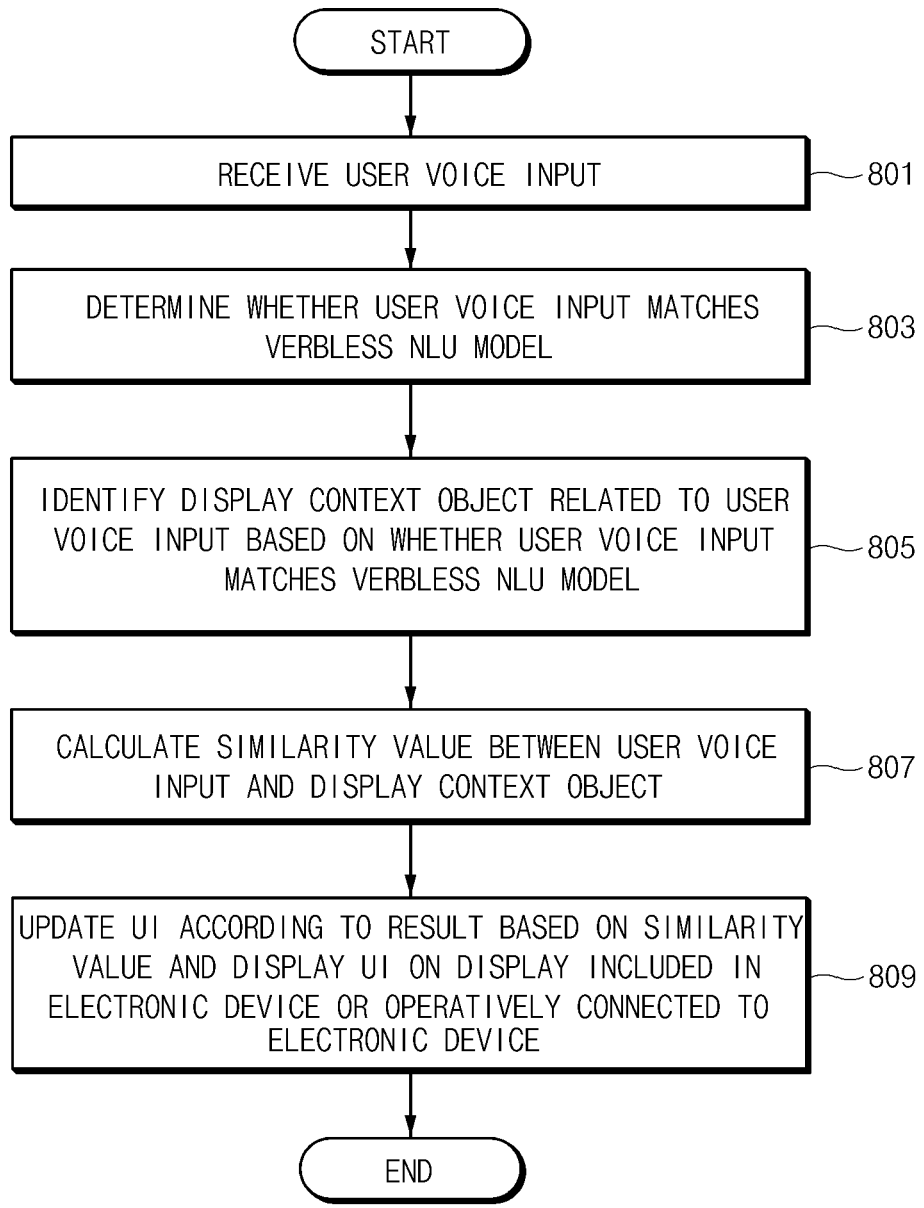
FIG. 8 is a flowchart of a method performed by an electronic device, according to an embodiment disclosed in the specification.

FIG. 8 is a flowchart 800 of a method performed by an electronic device, according to an embodiment disclosed in the specification. According to an embodiment, it may be understood that a process illustrated in FIG. 8 is performed by a processor (e.g., the processor 120 of FIG. 1 or the processor 601 of FIG. 6) of an electronic device (e.g., the electronic device 101 of FIG. 1 or the electronic device 600 of FIG. 6) by executing instructions stored in a memory (e.g., the memory 130 of FIG. 1 or the memory 602 of FIG. 6).

In operation 801, the electronic device 101 may receive a user's voice input. The user's voice input may include an input uttered by the user by using, which is analyzed by a speech recognition system of the electronic device 101. For example, the voice command may mean an input uttered by the user by using a voice assistant. The electronic device 101 may receive the user's voice command by using a user interface (e.g., the user interface 603 of FIG. 6) included in the electronic device 101 or operatively connected to the electronic device 101.

In operation 803, the electronic device 101 may determine whether the user input matches the verbless NLU model. The verbless NLU model may determine whether the user input includes a verb and/or a reaction. In an embodiment, when it is determined that the user input does not match the verbless NLU model, the electronic device 101 may determine that the user input that is sequentially entered is unlikely to match the verbless NLU model, and then may execute a domain/intent/slot classification NLU model without matching the verbless NLU model.

In an embodiment, the domain/intent/slot classification NLU model is a model composed of a forward-based probability model. The electronic device 101 may also calculate domain/intent/slot information by using only input data, which is added, by utilizing a weight or result value calculated for the previous user input.

In an embodiment, when user utterance is received through a user input without an interval of a specific time or more, the electronic device 101 may determine whether the NLU model matches only the last delivered user utterance without processing a user utterance that is present in the middle.

In operation 805, the electronic device 101 may identify the display context object related to the user voice input based on whether the user's voice input matches the verbless NLU model. This will be described in detail with reference to FIGS. 11 and 12.

In operation 807, the electronic device 101 may calculate similarity between the user voice input and the display context object.

In an embodiment, the electronic device may calculate the similarity by using a method of searching for the word and/or phrase with the highest similarity, by embedding words included in the user voice input, phrases included in the user voice input, and/or the entire voice input corresponding to the entire utterance. The embedding may refer to a scheme of expressing string data as a numeric vector. For example, the electronic device 101 may search for a word and/or phrase having high similarity by using word-embedding of expressing a word included in a voice input as a dense vector.

When the similarity is greater than or equal to a threshold, in operation 809, the electronic device 101 may update the UI according to the result and then may display the UI on a display included in the electronic device 101 or operatively connected to the electronic device 101. This will be described in detail with reference to FIGS. 12, 13, and 15 to 16.

It is illustrated in FIG. 8 that the electronic device 101 sequentially performs operation 801 to operation 809. However, this is only an example. For example, the operations may be performed at the same time. Some of the operations may be performed by the electronic device 101 and the others thereof may be performed by an external device. For example, operation 801 and operation 807 may be performed by the electronic device 101 and operation 809 may be performed by a server (e.g., the server 108 of FIG. 1).

According to an embodiment disclosed in this specification, a method performed by an electronic device may include receiving a voice input of a user using a microphone included in the electronic device or operatively connected to the electronic device, determining whether the voice input is matched with a verbless NLU model for determining the presence or absence of a verb, identifying a display context object associated with the voice input based on whether the voice input is matched with the verbless NLU model, calculating a similarity value between the voice input and the display context object, updating a user interface based on the similarity value depending on the calculated result, and displaying the user interface on a display which is included in the electronic device or which is operatively connected to the electronic device.

According to an embodiment disclosed in this specification, the updating and displaying of the user interface may include displaying an object determined depending on the calculated result so as to be distinguished from another object displayed on the display.

According to an embodiment disclosed in this specification, the identifying of the display context object may include identifying the display context object associated with the voice input based on whether the voice input at least partly includes a substring of the display context object when the voice input is matched with the verbless NLU model.

According to an embodiment disclosed in this specification, the identifying of the display context object may include determining a domain, intent, and slot of the voice input using an NLU model for classifying a domain, intent, and slot with respect to a voice input and identifying a display context object having the same type of a slot as the determined slot when the voice input is not matched with the verbless NLU model.

According to an embodiment disclosed in this specification, the method performed by the electronic device may further include initializing the similarity value when the display context object having the same type of a slot as the determined slot is not identified.

According to an embodiment disclosed in this specification, the method performed by the electronic device may further include setting at least one of an ambiguous state value or a level value based on the number of display context objects associated with the voice input when the voice input is matched with the verbless NLU model.

According to an embodiment disclosed in this specification, the method performed by the electronic device may further include setting the ambiguous state value to 'none' and setting the level value to '0' when the number of display context objects associated with the voice input is '0'.

According to an embodiment disclosed in this specification, the method performed by the electronic device may further include setting the ambiguous state value to 'false' and setting the level value to the calculated similarity value when the number of display context objects associated with the voice input is '1'.

According to an embodiment disclosed in this specification, the method performed by the electronic device may further include setting the ambiguous state value to 'true' and setting the level value to the calculated similarity value when the number of display context objects associated with the voice input is greater than or equal to '2'.

According to an embodiment disclosed in this specification, the method performed by the electronic device may further include setting at least one of an ambiguous state value or a level value based on whether the similarity value is greater than or equal to a threshold.

Figure 9:
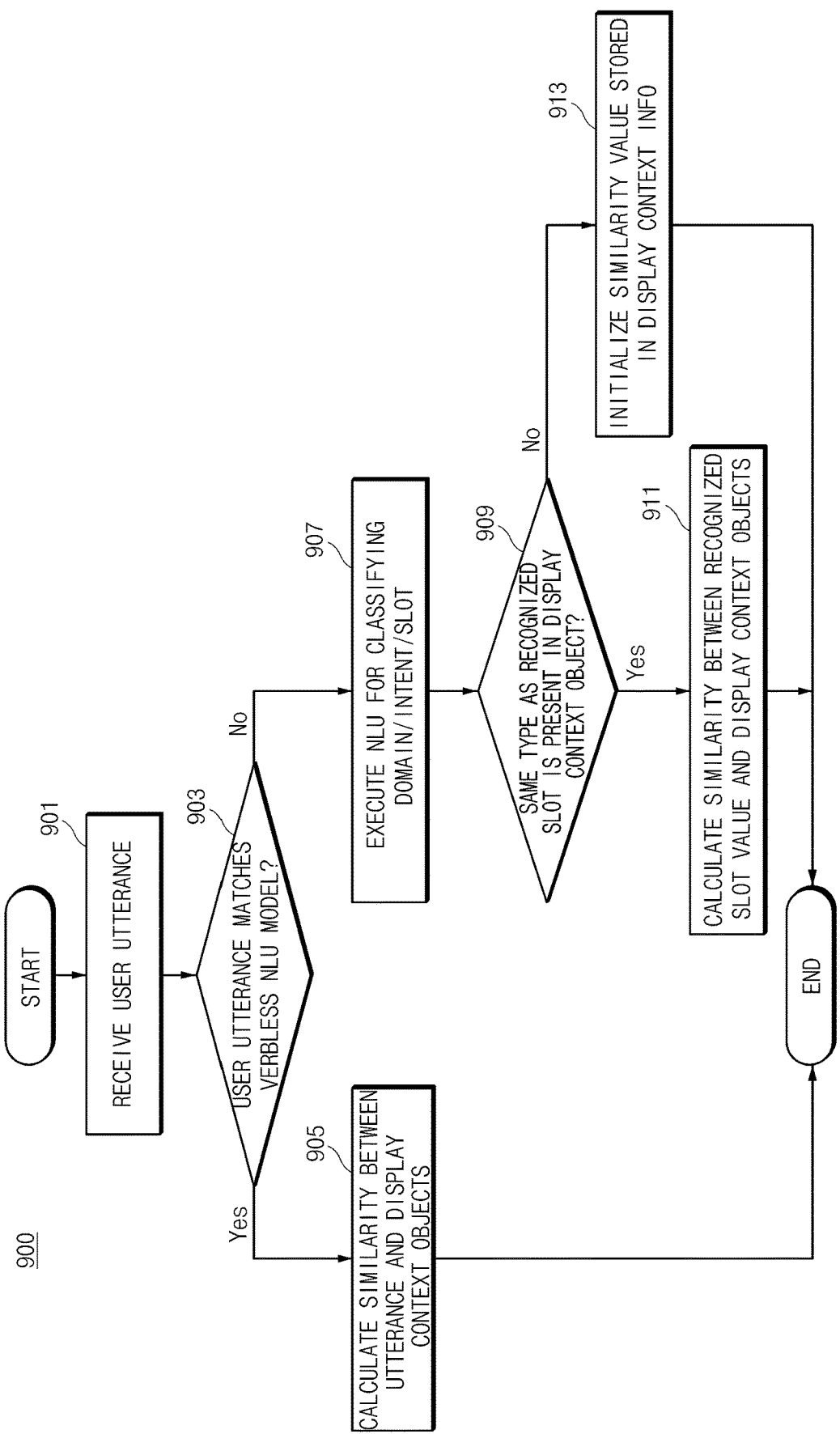
FIG. 9 is a flowchart of a method performed by an electronic device, according to an embodiment disclosed in the specification.

FIG. 9 is another flowchart 900 of a method performed by an electronic device, according to an embodiment disclosed in the specification. For clarity of description, descriptions the same as the above-mentioned descriptions may be briefly described or omitted. According to an embodiment, it may be understood that the process illustrated in FIG. 9 is performed by a processor (e.g., the processor 120 of FIG. 1) of an electronic device (e.g., the electronic device 101 of FIG. 1 or the electronic device 600 of FIG. 6) by executing instructions stored in a memory (e.g., the memory 130 of FIG. 1).

In operation 901, the electronic device 101 may receive a user's voice input. The user voice input may include an input uttered by the user by using a speech recognition system of the electronic device 101. Alternatively, or in addition, the voice command may include an input uttered by the user by using a voice assistant.

In operation 903, the electronic device 101 may determine whether the user voice input matches the verbless NLU model. When the user voice matches the verbless NLU model (operation 903—'Yes'), the electronic device 101 may perform operation 905. On the other hand, when the user voice does not match the verbless NLU model (operation 903—'No'), the electronic device 101 may perform operation 907.

In operation 905, the electronic device 101 may calculate the similarity between the user voice input and the display context object. Hereinafter, operation 905 will be described in detail with reference to FIG. 10.

In operation 907, the electronic device 101 may execute an NLU model for classifying domain/intent/slot. For example, when a user commands "please play it" after "Jurassic World Fallen Kingdom", an NLU model may classify domain/intent/slot depending on an input.

In operation 909, the electronic device 101 may determine whether the same type as the recognized slot is present in the display context object. When it is determined that the same type is present (operation 909—'Yes'), in operation 911, the electronic device 101 may calculate the similarity value between the recognized slot and the display context object. This will be described in detail with reference to FIG. 11.

On the other hand, when it is determined that the same type is not present (operation 909—'No'), in operation 913, the electronic device 101 may initialize the similarity value stored in the display context information module (e.g., the display context information module 720 of FIG. 7).

It is illustrated in FIG. 9 that the electronic device 101 sequentially performs operation 901 to operation 913. However, this is only an example. For example, at least some of the operations may be performed at the same time. A part of the operations may be performed by the electronic device 101 and the other parts may be performed by an external device. For example, some of the operations may be performed by the electronic device 101 and the others thereof may be performed by a server.

FIG. 10 is an exemplary diagram of a result obtained as an electronic device determines whether a verbless NLU model is matched, and determines similarity according to the determined result. For clarity of description, descriptions of portions that are the same as the above-mentioned descriptions may be briefly described or omitted. According to an embodiment, it may be understood that a method, in which an electronic device determines whether a verbless NLU model is matched, and determines similarity according to the determined result and which is described with reference to FIG. 10, is performed by a processor (e.g., the processor 120 of FIG. 1) of an electronic device (e.g., the electronic device 101 of FIG. 1 or the electronic device 600 of FIG. 6) by executing instructions stored in a memory (e.g., the memory 130 of FIG. 1).

According to an embodiment, when receiving a user input, the electronic device 101 may determine whether the user has uttered a title, name, phrase, descriptor, identifier, etc. of the display context object on a screen without verb expression, by using the verbless NLU model.

FIG. 10 illustrates that "Jurassic World Fallen Kingdom" is present in the display context object and utterances 1001, which are delivered as user commands, such as "Jurassic" 1002, "Jurassic World" (1003), "Jurassic World Fallen" (1004), and "Jurassic World Fallen Kingdom" (1005) are sequentially entered.

Referring to FIG. 10, the electronic device 101 may determine (1012, 1013, 1014, and 1015) that each of the utterances 1002, 1003, 1004, and 1005 delivered as user inputs match a substring-based verbless NLU model 1011.

When it is determined that the verbless NLU model is matched, the electronic device 101 may calculate a similarity value between display context object and the user uttrances. As illustrated in FIG. 10, user utterances thus sequentially entered are substrings of "Jurassic World Fallen Kingdom", which are display context objects, such as "Jurassic" 1002, "Jurassic World" 1003, "Jurassic World Fallen" 1004, and "Jurassic World Fallen Kingdom" 1005, and thus the electronic device 101 may determine that each of the user utterances is matched with the verbless NLU model (1012, 1013, 1014, and 1015).

The electronic device 101 may calculate similarity values for the display context object as 0.4 (1022), 0.67 (1023), 0.86 (1024), and 1 (1025), respectively. The electronic device 101 may update a UI by, in real time, reflecting the similarity value changed depending on the user utterance that are sequentially input and may display the UI on a screen.

FIG. 11 is an exemplary diagram of a result obtained as an electronic device classifies domains, intents, and slots depending on a user input and determines similarity depending on the classified result when a user voice input does not match to the verbless NLU model. For clarity of description, descriptions of the sections that are the same as the above-mentioned descriptions may be briefly described or omitted. According to an embodiment, it may be understood that a method, in which an electronic device classifies domain/intent/slot depending on a user input and determines similarity depending on the classified result and which is described with reference to FIG. 11, is performed by a processor (e.g., the processor 120 of FIG. 1) of an electronic device (e.g., the electronic device 101 of FIG. 1 or the electronic device 600 of FIG. 6) by executing instructions stored in a memory (e.g., the memory 130 of FIG. 1).

FIG. 11 illustrates that "Jurassic World Fallen Kingdom" is present in the display context object and utterances 1101, which are delivered as user inputs, such as "Jurassic World Fallen Kingdom" 1102, "play Jurassic World Fallen Kingdom" 1103, and "please play Jurassic World Fallen Kingdom" 1104 are sequentially entered.

Because the utterances 1102, 1103, and 1104 delivered as user inputs include a reaction or verb, the electronic device 101 may determine that the utterances 1102, 1103, and 1104 do not match the verbless NLU model, and in response matches the utterances 1102, 1103, and 1104 to a domain/ intent/slot NLU model 1111 for the purpose of classifying the domain, intent, and/or slot of each of the utterances 1102, 1103, and 1104 delivered as user inputs.

Referring to FIG. 11, each of "Jurassic World Fallen Kingdom" 1102, "play Jurassic World Fallen Kingdom" 1103, and "please play Jurassic World Fallen Kingdom" 1104, which are entered through the utterances 1101 delivered as user inputs may be classified into the same domain, intent, and slot (1112, 1113, and 1114). For example, each of domains of the utterances 1102, 1103, and 1104 delivered as user inputs is "movie" and the intent thereof is "play".

Referring to FIG. 11, "Jurassic World Fallen Kingdom" 1102, "play Jurassic World Fallen Kingdom" 1103, and "please play Jurassic World Fallen Kingdom" 1104, which are entered through the utterances 1101 delivered as user inputs, may be classified into the same slot of 'Jurassic World Fallen Kingdom' (1112, 1113, and 1114). Each of "Jurassic World Fallen Kingdom" 1102, "play Jurassic World Fallen Kingdom" 1103, and "please play Jurassic World Fallen Kingdom" 1104 matches a display context object of "Jurassic World Fallen Kingdom", and thus may have all similarity values 1122, 1123, and 1124 of '1'.

Figure 12:
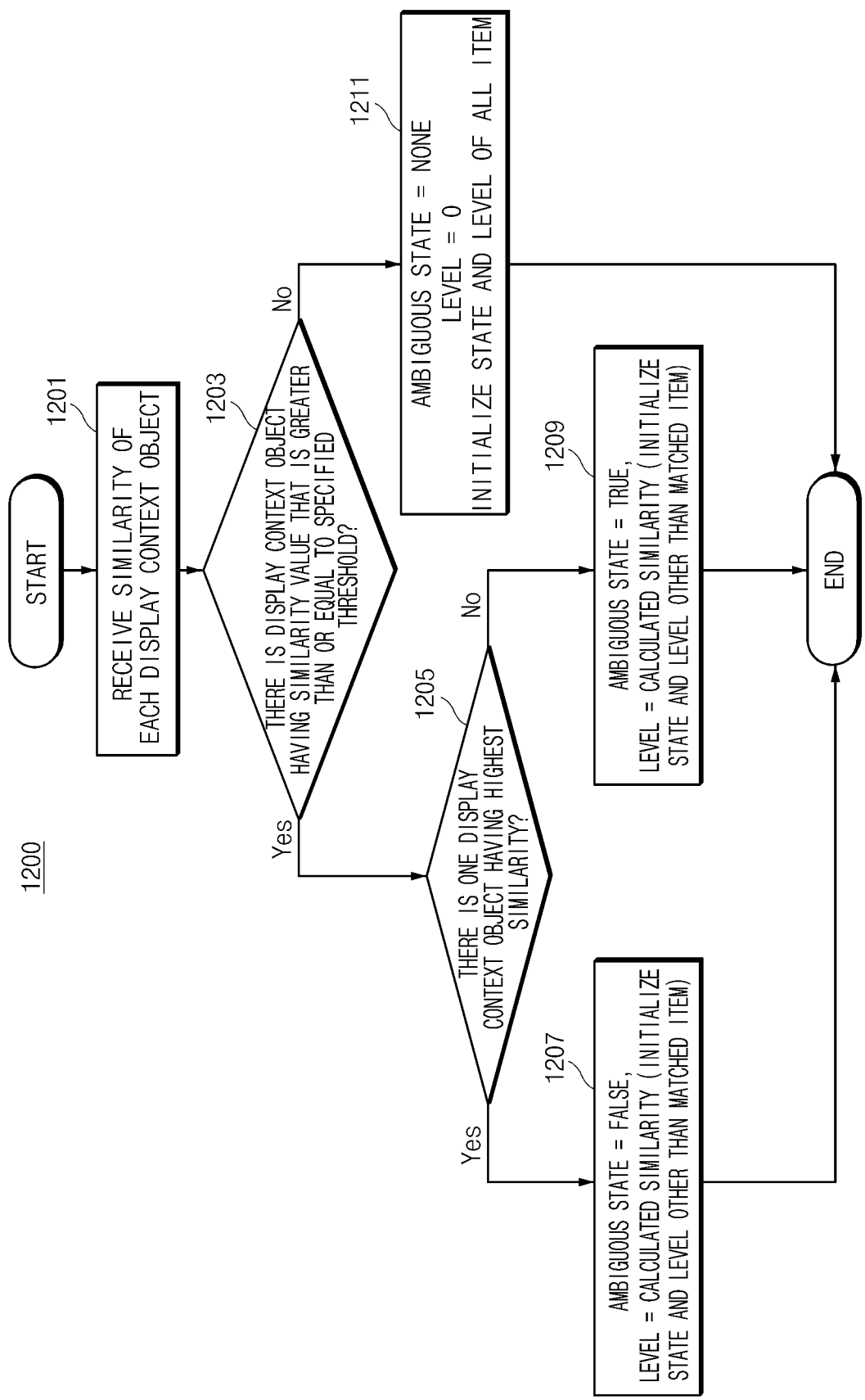
FIG. 12 is another flowchart of a method performed by an electronic device, according to an embodiment of the disclosure.

FIG. 12 is another flowchart 1200 of a method performed by an electronic device, according to an embodiment disclosed in the specification. According to an embodiment, it may be understood that the process illustrated in FIG. 12 is performed by a processor (e.g., the processor 120 of FIG. 1) of an electronic device (e.g., the electronic device 101 of FIG. 1 or the electronic device 600 of FIG. 6) by executing instructions stored in a memory (e.g., the memory 130 of FIG. 1). For clarity of description, descriptions that are the same as the above-mentioned descriptions may be briefly described or omitted.

In operation 1201, the electronic device 101 may receive a similarity value of each display context object. According to an embodiment, the electronic device 101 may receive a similarity value of each display context object from a display context information module (e.g., the display context information module 720 of FIG. 7) in response to the received user input. In some embodiments, the similarity values are calculated by the electronic device 101 itself.

In operation 1203, the electronic device 101 may determine whether there is a display context object having a similarity value that is greater than or equal to a specified threshold. When the display context object having the similarity that is greater than or equal to the specified threshold is not present (operation 1203—'No'), in operation 1211, the electronic device 101 may set an ambiguous state value to "None" and may initialize a level to '0'. When the display context object having the similarity value that is greater than or equal to the specified threshold is present (operation 1203—'Yes'), the electronic device 101 may perform operation 1205.

In operation 1205, the electronic device 101 may determine whether there is one display context object having the highest threshold. When it is determined that there is one display context object having the highest threshold (operation 1205—'Yes'), in operation 1207, the electronic device 101 may set an ambiguous state value to "false" and may set a level to the calculated similarity value. In an embodiment, when there are a plurality of display context objects found based on similarity, but a specific display context object has a high priority (e.g., when the specific display context object is already focused on a screen), the electronic device 101 determines that only the specific display context object is the display context object such that the display context object is capable of being counted as one.

In an embodiment, when there is only one specific display context object having the highest similarity, and this similarity value is greater than or equal to a threshold, the electronic device 101 may set the ambiguous state to "false", and may update a UI to be displayed on a screen based on the setting such that the UI indicates a current state. The threshold is predetermined and can be configurable in some embodiments.

In an embodiment, when it is determined that the number of display context objects having the highest similarity value is not one (operation 1205—'No'), in operation 1209, the electronic device 101 may set the ambiguous state value to "true" and may set a level to the calculated similarity value. The ambiguous state that is true may mean that there are a plurality of display context objects corresponding to an utterance received as a user input, and may indicate a current state by updating the UI on a screen based on the ambiguous state.

It is illustrated in FIG. 12 that the electronic device 101 sequentially performs operation 1201 to operation 1211. However, this is only an example. For example, at least some of the operations may be performed at the same time. Some of the operations may be performed by the electronic device 101 and the others thereof may be performed by an external device. For example, it is determined whether there is one display context object having the highest similarity value, by first performing operation 1205, and then operation 1203 may be performed. In operation 1203, the electronic device 101 may determine whether there is a display context object having a similarity value equal to or greater than a specified threshold, and may perform one of operation 1207, operation 1209, and operation 1211 depending on the result.

Figure 13:
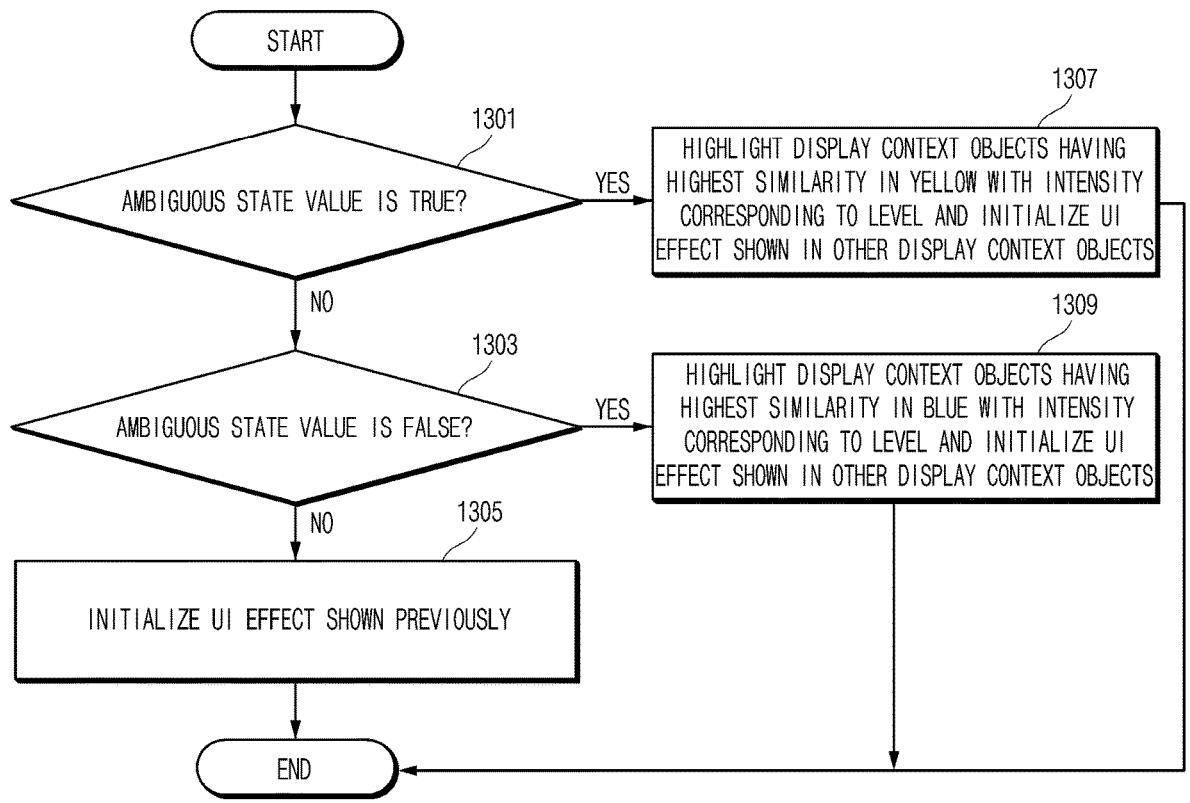
FIG. 13 is another flowchart of a method performed by an electronic device, according to an embodiment of the disclosure.

FIG. 13 is another flowchart 1300 of a method performed by an electronic device, according to an embodiment disclosed in the specification. According to an embodiment, it may be understood that the process illustrated in FIG. 13 is performed by a processor (e.g., the processor 120 of FIG. 1) of an electronic device (e.g., the electronic device 101 of FIG. 1 or the electronic device 600 of FIG. 6) by executing instructions stored in a memory (e.g., the memory 130 of FIG. 1). For clarity of description, descriptions the same as the above-mentioned descriptions may be briefly described or omitted.

FIG. 13 is a flowchart 1300 of a method in which the electronic device 101 updates and displays a UI on a screen.

In operation 1301, the electronic device 101 may determine whether an ambiguous state value is true. The ambiguous state value that is true may mean that there are a plurality of display context objects corresponding to an utterance received as a user input. When it is determined that the ambiguous state value is true (operation 1301—'Yes'), the electronic device 101 may perform operation 1307.

In operation 1307, the electronic device 101 may highlight and display a display context object having the highest similarity in a first color (e.g., yellow). The highest similarity may indicate the display context object with the highest similarity value to the received utterance. For example, the electronic device 101 may highlight a display context object having the highest similarity with intensity corresponding to a set level value. Alternatively, or in addition, the electronic device 101 may initialize a UI effect in a display context object other than the display context object having the highest similarity. For example, a second display context object may be displayed with faded colors, or in monochrome, or a different (smaller) size, etc., in comparison to the (first) display context object with the highest similarity value.

In an embodiment, when the electronic device 101 initializes the UI effect shown previously, the electronic device 101 may directly update the UI based on the changed ambiguous state value and level value, and thus may provide an effect such that the UI is gradually updated based on a predetermined time (e.g., a time until the next input is received).

On the other hand, when it is determined that the ambiguous state value is not true (operation 1301—'No') in operation 1301, the electronic device 101 may determine whether the ambiguous state value is false in operation 1303. When it is determined that the ambiguous state value is false (operation 1303—'Yes'), the electronic device 101 may perform operation 1309.

In operation 1309, the electronic device 101 may highlight and display the display context object having the highest similarity in a second color (e.g., blue). For example, the electronic device 101 may highlight and display the display context object having the highest similarity with intensity corresponding to the set level value. The electronic device 101 may initialize a UI effect shown in another display context object other than the display context object having the highest similarity.

In an embodiment, when the electronic device 101 initializes the UI effect shown previously, the electronic device 101 may directly update the UI based on the changed ambiguous state value and level, and thus may provide an effect such that the UI is gradually updated based on a predetermined time (e.g., a time at which the next user input is received).

When it is determined that the ambiguous state value is not false (operation 1303—'No') in operation 1303, the electronic device 101 may initialize the UI effect shown previously in operation 1305.

In an embodiment, when the electronic device 101 initializes the UI effect shown previously, the electronic device 101 may directly update the UI based on the changed ambiguous state value and level value, and thus may provide an effect such that the UI is gradually updated based on a predetermined time (e.g., a time at which the next user input is received).

According to the method shown in FIG. 13, the electronic device may display an ambiguous state value to a user by using a highlighting color and may also display information about a level value by using the brightness of the highlighting color. However, the method shown in FIG. 13 is only an example, and the electronic device 101 may display the ambiguous state value by using other effects. For example, the electronic device 101 may display a text for describing an ambiguous state value on a screen or may display a text regarding the matched display context object or a thumbnail regarding the matched display context object on the screen based on the matched display context object. The level value may also be displayed by using other UI elements in addition to the intensity of brightness. The UI elements can include one or more visual effects, such as size, shape, icons, transformations, animations, and the like. In some embodiments, the UI elements can include other user indications including haptic feedback, audible feedback, etc., or a combination thereof.

It is illustrated in FIG. 13 that the electronic device 101 sequentially performs operation 1301 to operation 1309. However, this is only an example. For example, at least some of the operations may be performed at the same time. Some of the operations may be performed by the electronic device 101 and the others thereof may be performed by an external device.

Figure 14:
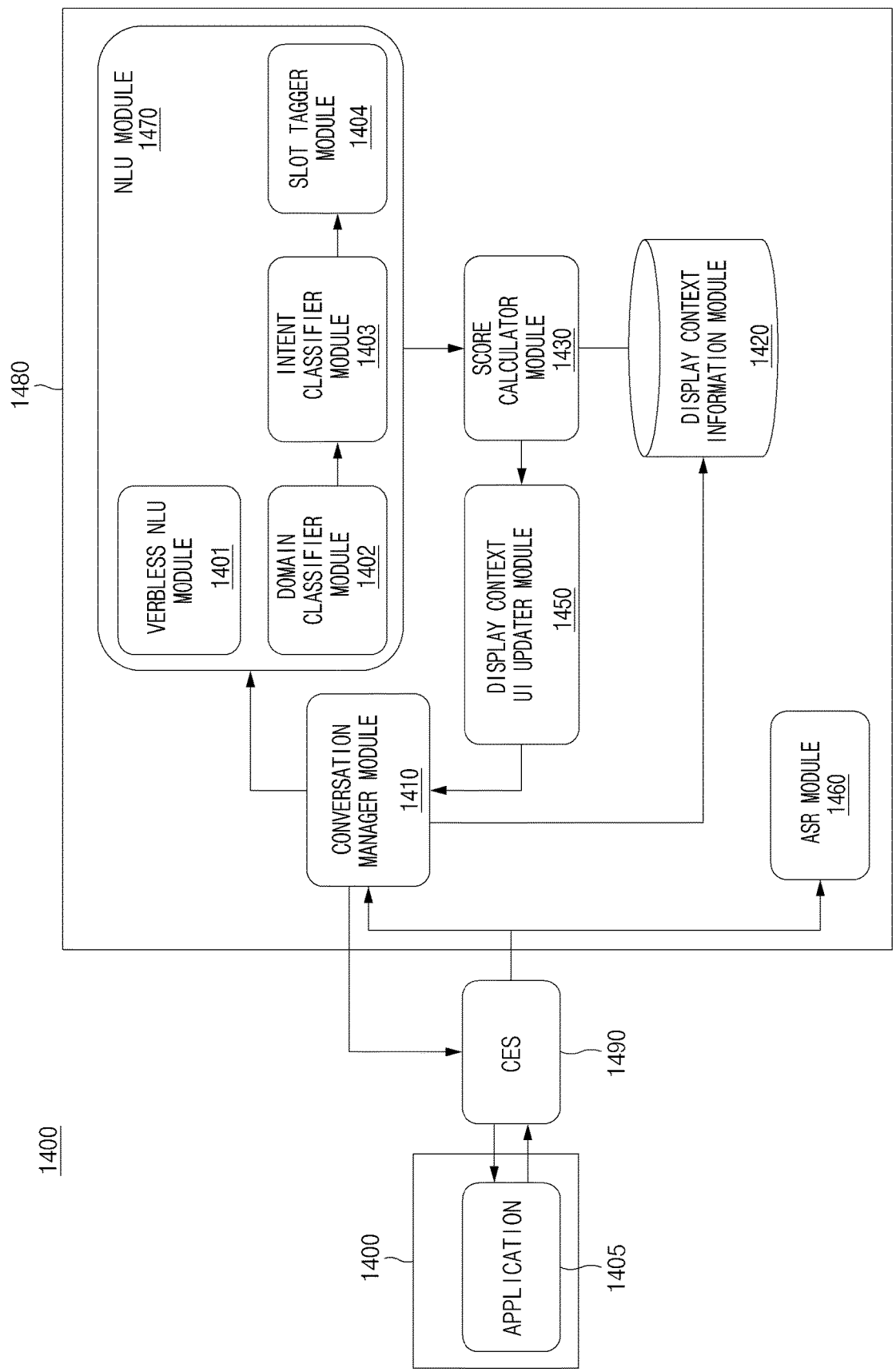
FIG. 14 is a diagram for describing an operation of an intelligent assistant system, according to an embodiment disclosed in the specification.

FIG. 14 is a diagram 1400 for describing an operation of an intelligent assistant system, according to an embodiment disclosed in the specification. For clarity of description, descriptions the same as the above-mentioned descriptions may be briefly described or omitted.

In an embodiment, the intelligent assistant system may include an electronic device 1481, a capsule execution service (CES) 1482, and a server 1480. In an embodiment, the CES 1482 and the server 1480 may be integrated into one server or may be implemented with an independent server.

In an embodiment, the electronic device 1481 and the server 1480 may transmit and receive data through the CES 1482. In an embodiment, the CES 1482 may start services for processing an utterance, which is received through the electronic device 1481 and which is entered by a user, and may mediate the result of processing the utterance. For example, the CES 1482 may execute an automatic speech recognition service to receive a voice uttered by the user, may transmit a natural language based on the input voice to the server 1480, and may deliver the result of processing the utterance in the server 1480 to the electronic device 1481.

In an embodiment, when a user input is received, the electronic device 1481 may transmit the received user input and display context information, which is displayed on a screen and which is obtained from the application 1405, to the CES 1482 together.

The CES 1482 may deliver the user input and the display context information to the server 1480 (e.g., a conversation manager module 1410 and an ASR module 1460).

The conversation manager module 1410 may store the display context information in a display context information module 1420.

When the ASR module 1460 delivers the converted text to the conversation manager module 1410 in real time, the ASR module 1460 may determine whether the corresponding input is a screen control utterance, through NLU. When the corresponding input is the control utterance, the ASR module 1460 may deliver the found context target to a score calculator module 1430.

In an embodiment, the conversation manager module 1410 may indirectly receive the converted text through the CES 1482 or may directly receive the converted text from the ASR module 1460.

The score calculator module 1430 may measure a similarity value between the NLU result and the stored display context information and may store the similarity value in the display context information module 1420.

The score calculator module 1430 may allow a display context UI updater module 1450 to receive a notification of the measured similarity value or may directly deliver the measured similarity value to the display context UI updater module 1450.

The display context UI updater module 1450 may determine an ambiguous state value and a level value based on the measured similarity value and may deliver the ambiguous state value and the level value to an application 1405 to update a UI in real time.

An NLU module 1470 may determine whether a user utterance is a display context control utterance, by using a verbless NLU module 1401. When it is determined that the user utterance is the control utterance, the NLU module 1470 may deliver an action value defined in the display context to the application 1405.

In an embodiment, when it is determined that the user utterance is not a control utterance, the domain, intent, and/or slot of the user utterance may be classified by using a domain classifier module 1402, an intent classifier module 1403, and/or a slot tagger module 1404.

FIG. 14 illustrates that all of the domain classifier module 1402, the intent classifier module 1403, and/or the slot tagger module 1404 are positioned in the server, but this is an example. In other examples, some of the modules may be positioned in the electronic device 1481 or the server 1480.

Figure 15:
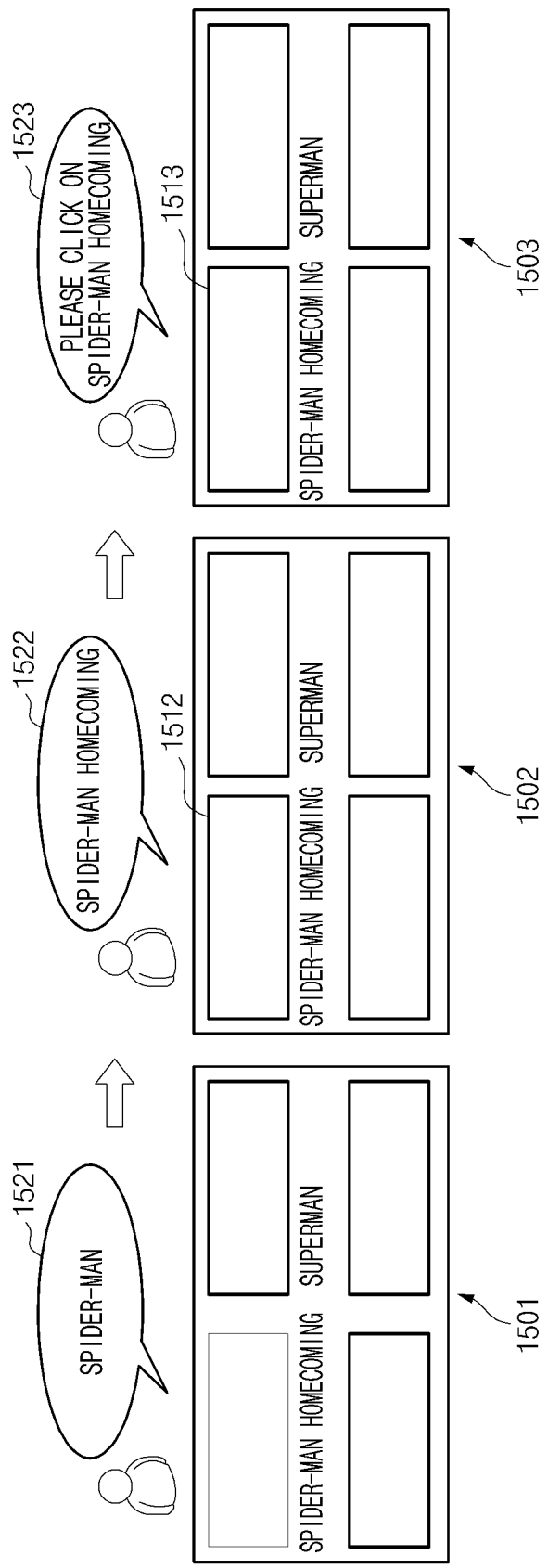
FIG. 15 is an exemplary diagram of a method performed by an electronic device, according to an embodiment disclosed in the specification.
Figure 16:
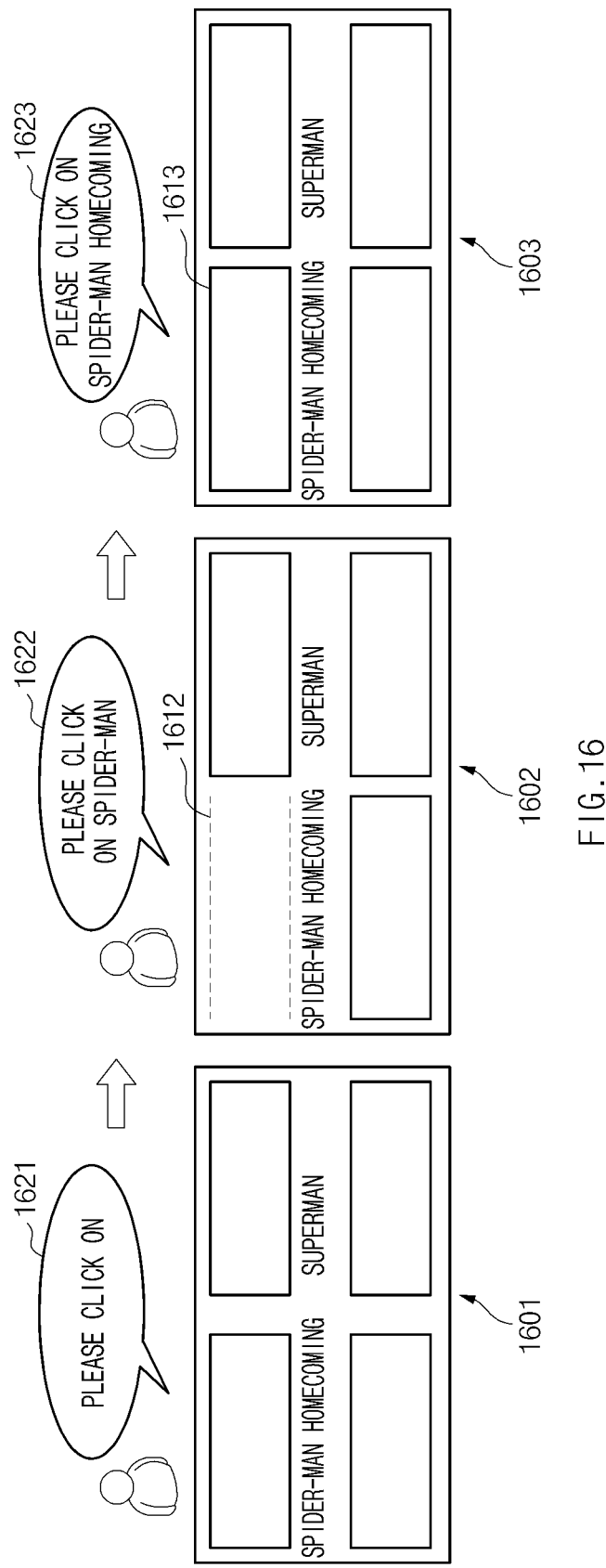
FIG. 16 is another exemplary diagram of a method performed by an electronic device, according to an embodiment disclosed in the specification.

Hereinafter, a method performed by the electronic device 101 according to an embodiment will be described in detail with reference to exemplary diagrams illustrated in FIGS. 15 to 16. In FIGS. 15 to 16, it is assumed that the display context object is content. This is an example and, the display context object is not limited to being a content.

FIG. 15 is an exemplary diagram of a method performed by an electronic device according to an embodiment. FIG. 15 shows "Spider-Man Homecoming" and "Superman" as display context objects.

In an embodiment, in the electronic device 101, when an utterance received as a user input is 'Spider-Man' 1521, the utterance may be a substring of "Spider-Man Homecoming" that is one of display context objects and thus may be matched to a verbless NLU model. In the case, an ambiguous state value is false, but a similarity value is less than 1, and thus a UI may be updated as illustrated a first state 1501.

In an embodiment, when an utterance received as a user input is "Spider-Man Homecoming" 1522, the utterance may be a substring of "Spider-Man Homecoming" that is one of display context objects and thus may be matched to a verbless NLU model. Accordingly, the electronic device 101 may update the UI as illustrated in a second state 1502, which is highlighted more heavily than before because similarity is 1.

In an embodiment, when an utterance received as a user input is "please click on Spider-Man Homecoming" 1523, the utterance includes a substring of "Spider-Man Homecoming" that is one of display context objects, but the utterance does not match the verbless NLU model because the utterance includes a verb "click". It should be noted that in some embodiments a "verb" may be phrase/command that a user provides for the electronic device 101 to take an action. Accordingly, the electronic device 101 may execute a domain/intent/slot classification NLU model, not the verbless NLU model. In an embodiment, the electronic device 101 may search for a slot of "Spider-Man Homecoming" by using the domain/intent/slot classification NLU model. Because the type of the slot is the same as "Spider-Man Homecoming" that is present in the display context object, a similarity value has '1'. Accordingly, the ambiguous state value may be set to "false", and the level value may be set to '1'.

In an embodiment, the electronic device 101 may update the UI to be in a third state 1503 corresponding to the ambiguous state value (false) and level value (1).

FIG. 16 is another exemplary diagram of a method performed by an electronic device according to an embodiment. FIG. 16 shows "Spider-Man Homecoming" and "Superman" as display context objects.

In an embodiment, when an utterance received as user input is "please click on" 1621, the utterance does not match a verbless NLU model because the utterance includes a verb "click". Accordingly, the electronic device 101 may execute a domain/intent/slot classification NLU model, not the verbless NLU model.

In an embodiment, because the electronic device 101 does not find (as a result of the search) a slot that is the same as or similar to the display context objects by using the domain/intent/slot classification NLU model, the electronic device 101 may update the UI to be in a first state 1601.

In an embodiment, the electronic device 101 may perform score calculator on the next input by using the domain/intent/slot classification NLU model.

In an embodiment, when an utterance received as a user input is "please click on Spider-Man" 1622, the electronic device 101 may search for a slot of "Spider-Man" by using the domain/intent/slot classification NLU model. Although the type of the slot is included as a substring of "Spider-Man Homecoming" that is present in the display context object, the type of the slot is not the same, and thus a similarity value is less than '1'. Accordingly, the electronic device 101 may update the UI as shown in a second state 1602 in which "Spider-Man Homecoming" is indicated by a dotted line 1612.

In an embodiment, when an utterance received as a user input is "please click on Spider-Man Homecoming" 1623, the electronic device 101 may search for a slot of "Spider-Man Homecoming" by using the domain/intent/slot classification NLU model. Because the type of the slot is the same as a substring of "Spider-Man Homecoming" that is present in the display context object, a similarity value may have '1'. Accordingly, the electronic device 101 may update the UI as shown in a third state 1603 in which "Spider-Man Homecoming" is highlighted with a dark line 1613.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic,"

"logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a microphone;
a display;
a memory; and
a processor operatively connected to the microphone, the display, and the memory, wherein the memory stores instructions that, when executed, cause the processor to:
receive a first voice input of a user using the microphone;
identify a first context object associated with the first voice input among a plurality of context objects displayed through the display;
calculate a first similarity value between the first voice input and the first context object;
if the first similarity value is below threshold, display the first context object in a first effect;
receive a second voice input of the user using the microphone while the first context object is displayed in the first effect:
calculate a second similarity value between the second voice input and the first context object; and
if the second similarity value exceeds the threshold, display the first context object in a second effect.

2. The electronic device of claim 1, wherein the instructions cause the processor to:
display the first context object and a second context object distinguishably from each other,
wherein the second context object includes at least one of the remaining context objects among the plurality of context objects excluding the first context object.

3. The electronic device of claim 1, wherein the instructions cause the processor to:
if the first voice input does not include a verb, identify a context object input including at least a substring associated with the first voice input among the plurality of context objects, as the first context object.

4. The electronic device of claim 1, wherein the instructions cause the processor to:
if the first voice input includes a verb, determine a domain, intent, and slot of the first voice input; and
identify a context object having the same type of a slot as the first context.

5. The electronic device of claim 4, wherein the instructions cause the processor to:
in response to the context object having the same type of the slot is not identified, initialize the first similarity value.

6. The electronic device of claim 1, wherein the instructions cause the processor to:
if a plurality of context objects associated with the first voice input is identified;
calculate the first similarity value tween the first voice input and each of the plurality of context objects associated with the first voice input;
select, based on the first similarity value, one of the plurality of c as the first context objects.

7. The electronic device of claim 1, wherein the first effect includes a highlighting effect with a specified first color; and
wherein the second effect includes a highlighting effect with a specified second color.

8. The electronic device of claim 7, wherein the instructions cause the processor to:
change a brightness of the first context object displayed in the second effect, based on the second similarity value.

9. The electronic device of claim 6, wherein the second voice input is sequentially received after the first voice input is received.

10. A method performed by an electronic device, the method comprising:
- receiving a first voice input;
- identifying a first context object associated with the first voice input among a plurality of context objects displayed through a display of the electronic device;
- calculating a first similarity value between the first voice input and the display first context object;
- if the first similarity value is below a threshold, displaying the first context object in a first effect;
- receiving a second voice input of the user using the microphone while the first context object is displayed in the first effect;
- calculating a second similarity value between the second voice input and the first context object; and
- if the second similarity value exceeds the threshold, displaying the first context object in a second effect.

* * * * *